(12) United States Patent
Byars et al.

(10) Patent No.: US 12,485,536 B2
(45) Date of Patent: Dec. 2, 2025

(54) VACUUM TUBE ASSEMBLY FOR MATERIAL REMOVAL

(71) Applicant: AMP Robotics Corporation, Louisville, CO (US)

(72) Inventors: Jonathan M. Byars, Lafayette, CO (US); Matthew Stanton, Denver, CO (US); James Gregory Braeckel, III, Highlands Ranch, CO (US); Stefan Michael Elsener, Erie, CO (US); Samuel Creighton, Golden, CO (US); Simon Patrick Hall, Denver, CO (US); Jacob John Schmidt, Denver, CO (US); Peter Edward Gayler, Arvada, CO (US); Richard Reisbick, Westminster, CO (US); Kevin Taylor, Boulder, CO (US); Jacob Fitzgerald, Wheat Ridge, CO (US)

(73) Assignee: AMP Robotics Corporation, Louisville, CO (US)

(*) Notice: Subject to any disclaimer, the term of this patent is extended or adjusted under 35 U.S.C. 154(b) by 894 days.

(21) Appl. No.: 17/725,316

(22) Filed: Apr. 20, 2022

(65) Prior Publication Data

US 2022/0347842 A1 Nov. 3, 2022

Related U.S. Application Data

(60) Provisional application No. 63/182,162, filed on Apr. 30, 2021.

(51) Int. Cl.
*B25J 9/16* (2006.01)
*B25J 15/06* (2006.01)
*B65G 47/91* (2006.01)

(52) U.S. Cl.
CPC ............. *B25J 9/1653* (2013.01); *B25J 9/163* (2013.01); *B25J 9/1666* (2013.01); *B25J 9/1697* (2013.01); *B25J 15/0616* (2013.01); *B65G 47/917* (2013.01)

(58) Field of Classification Search
CPC ........ B25J 9/1653; B25J 9/163; B25J 9/1666; B25J 9/1697; B25J 15/0616; B25J 13/087; B25J 15/0061; B65G 47/917; B65G 47/912; B65G 47/918; B07C 2501/0063; B07C 5/363; G05B 2219/50392; G05B 2219/39557
See application file for complete search history.

(56) References Cited

U.S. PATENT DOCUMENTS

| 4,651,381 | A | 3/1987 | Meidel |
|---|---|---|---|
| 9,387,518 | B2 | 7/2016 | Deppermann |
| 9,618,443 | B2 | 4/2017 | Smith |

(Continued)

*Primary Examiner* — Jacob S. Scott
*Assistant Examiner* — Miraj T. Patel
(74) *Attorney, Agent, or Firm* — Van Pelt, Yi & James LLP

(57) ABSTRACT

A vacuum tube assembly for removing material is disclosed, including: a vacuum generator configured to generate a vacuum airflow; one or more tubes coupled to the vacuum generator and configured to channel the vacuum airflow; and an actuation mechanism coupled to the one or more tubes, wherein the actuation mechanism is configured to actuate at least one tube from a first position relative to a material stream to a second position relative to the material stream, wherein the first position is farther from the material stream than the second position.

26 Claims, 15 Drawing Sheets

(56) References Cited

U.S. PATENT DOCUMENTS

| | | |
|---|---|---|
| 2003/0116483 A1 | 6/2003 | Pferdmenges |
| 2019/0217342 A1 | 7/2019 | Parr |
| 2020/0087118 A1* | 3/2020 | Sato .................... B66C 1/0268 |
| 2021/0061588 A1 | 3/2021 | Lukka |
| 2023/0364787 A1* | 11/2023 | Cygan .................... B25J 9/163 |

* cited by examiner

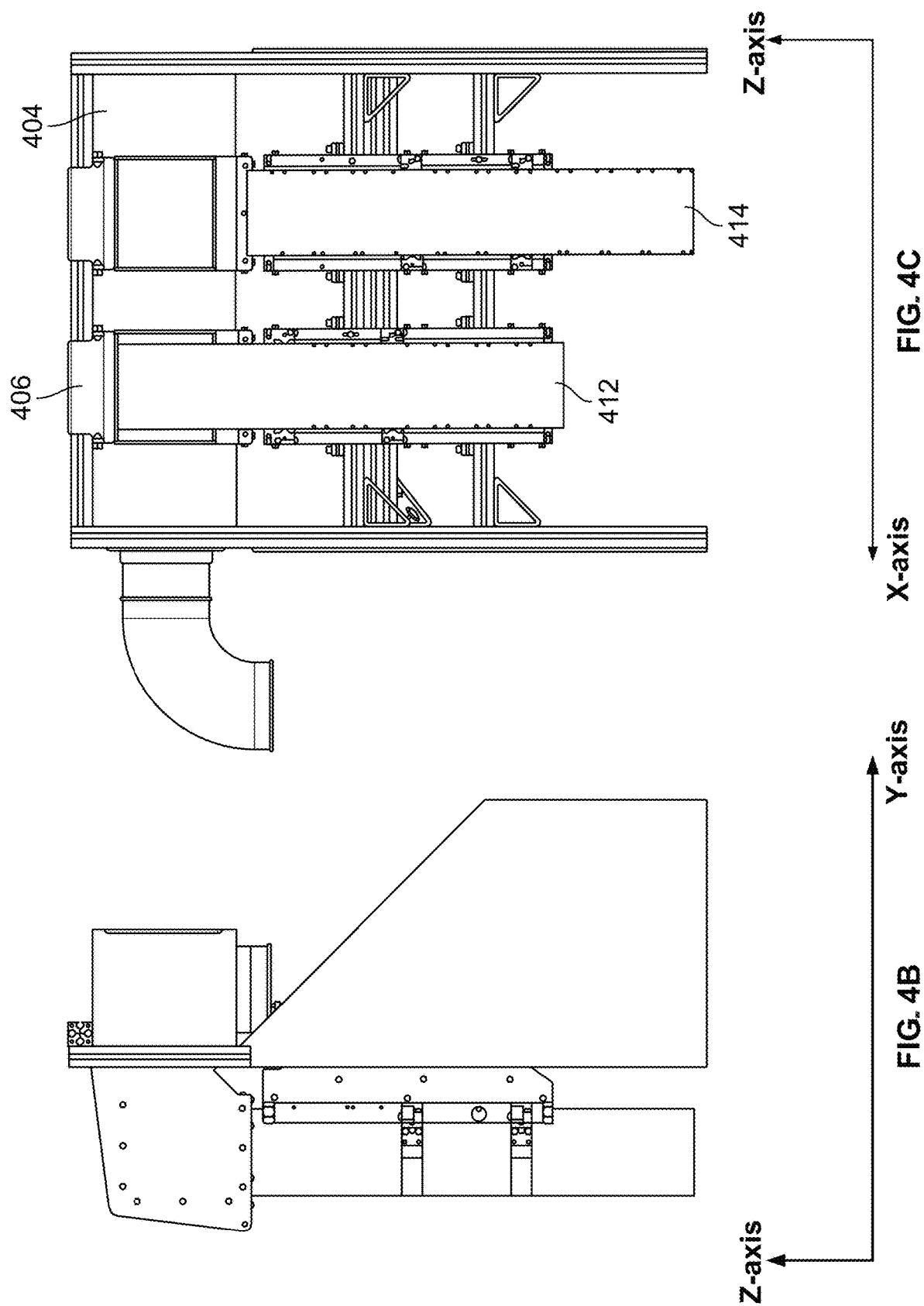

VACUUM TUBE ASSEMBLY FOR MATERIAL REMOVAL

CROSS REFERENCE TO OTHER APPLICATIONS

This application claims priority to U.S. Provisional Patent Application No. 63/182,162 entitled ACTUATED TUBE ASSEMBLY FOR MATERIAL REMOVAL filed Apr. 30, 2021 which is incorporated herein by reference for all purposes.

BACKGROUND OF THE INVENTION

Within many industrial facilities, objects are transported on conveyor belts from one location to another. Often a conveyor belt will carry an unsorted mixture of various objects and materials. Within recycling and waste management facilities, for example, some of the conveyed objects may be considered desirable (e.g., valuable) materials while others may be considered undesirable contaminants. For example, the random and unsorted contents of a collection truck may be unloaded at the facility onto a conveyor belt. Although sorting personnel may be stationed to manually sort materials as they are transported on the belt, the use of sorting personnel is limiting because they can vary in their speed, accuracy, and efficiency and can suffer from fatigue over the period of a shift. Human sorters also require specific working conditions, compensation, and belt speeds. Production time is lost to training the many new employees that enter as sorters, and operation costs increase as injuries and accidents occur.

The introduction of sorting systems (such as robotic systems, for example) for sorting materials has led to increased productivity and decreased contamination for Material Recovery Facilities (MRFs). Robots and similar systems have been utilized as a viable replacement, or supplement, for human sorters due to their speed, reliability, and durability. The objective of sorting systems is to recover the specific target material(s) and eject them into bunkers without introducing other materials (contaminants) into the sorted bunkers. A common technique used by these sorting systems to grasp target materials involves the use of a robotically positioned suction gripper.

BRIEF DESCRIPTION OF THE DRAWINGS

Various embodiments of the invention are disclosed in the following detailed description and the accompanying drawings.

FIG. 4B is a diagram showing a side view of the example of the vacuum tube assembly for material removal that was shown in FIG. 4A.

FIG. 4C is a diagram showing a cross section view of the example of the vacuum tube assembly for material removal that was shown in FIG. 4A.

DETAILED DESCRIPTION

Figure 1:
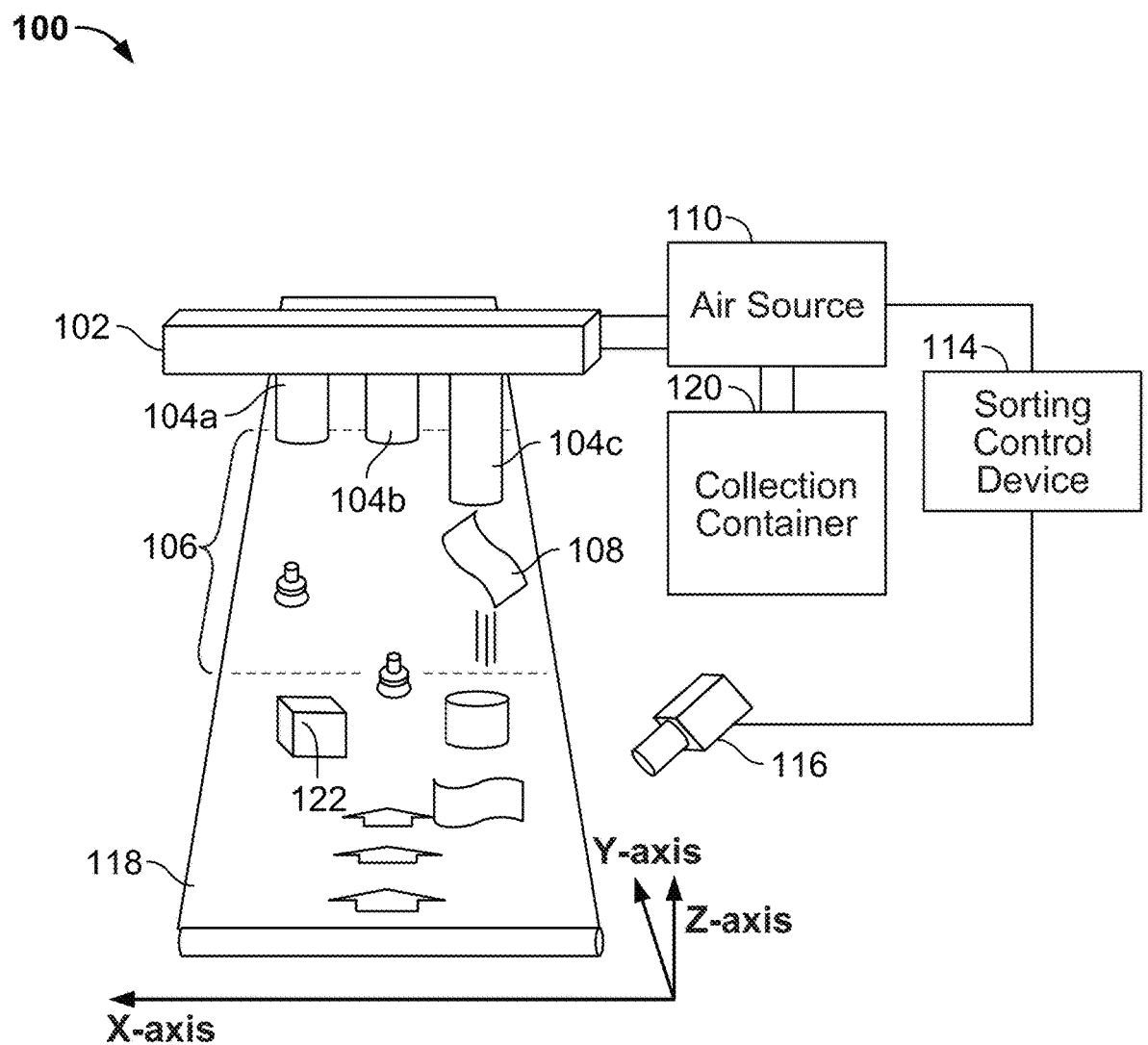
FIG. 1 is a diagram showing an embodiment of a system for material removal comprising a vacuum tube assembly in a sorting facility.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Robotic sorting has proven to be exceptionally good at picking and placing rigid objects with surface areas greater than or equal to three square inches. Non-rigid objects such as plastic bags have a lower success rate due to their tendency to deform and lose viable surface area to wrinkles and creases and interfere with suction. Objects smaller than three square inches in cross sectional area have trouble being picked and placed into appropriate bins since suction cups have difficulty sealing on them. Moreover, the robotic apparatus used to position the suction gripper, while less expensive over time as compared to human sorters, still requires a significant capital expense that leaves some material economically infeasible for collection and recycling.

For example, many Material Recovery Facilities (MRFs) request their customers not include items smaller than three square inches and thin film in their recycling, even though they are made of recyclable materials. MRFs will often tend to avoid retrieving paper since an excessive number of material and physical picks are required to accumulate an economical amount of mass. Rapidly moving mechanical elements can also present a hazard to facility personnel working near the sorting robot.

For the reasons stated above and for other reasons stated below, there is a need in the art for systems and methods for vacuum extraction for material sorting applications.

Embodiments of a vacuum tube assembly for a material removal are disclosed herein. In various embodiments, the vacuum tube assembly comprises a set of tubes that are coupled to a vacuum source. The vacuum source is configured to provide vacuum (negative) airflow through the set of vacuum tubes. In various embodiments, a vacuum is any low pressure region facilitating entrainment of objects. The set of vacuum tubes is coupled to an actuation mechanism that is configured to actuate one or more of the tubes closer or farther away from a material stream (e.g., that is being transported on a conveyor device). In some embodiments, when a tube is actuated (e.g., lowered) towards the material stream, the vacuum airflow that is communicated through the tube entrains a target object into the tube. The target object will travel (e.g., upwards) through the tube and be drawn by the vacuum airflow into a collection container. In various embodiments, the action of one or more tubes of the vacuum tube assembly entraining or attempting to entrain a target object is referred to as a "capture" operation. In some embodiments, a tube of the vacuum tube assembly that is not actively performing a capture operation is sometimes referred to as being in the "ready" state or position. In some embodiments, a tube of the vacuum tube assembly that is actively performing a capture operation is sometimes referred to as being in the "capture" state or position and where an end of the tube is closer to the material stream when the tube is in the capture state than when the same tube is in the ready state.

In various embodiments, to determine which objects among the objects in a material stream are target objects that the vacuum tube assembly should entrain, one or more sensors are used to capture sensed data regarding the material stream and then machine learning is applied to the sensed data to distinguish the target objects from the non-target objects. In some embodiments, a "target object" refers to an object that is identified to be entrained by the vacuum tube assembly and a "non-target object" refers to an object that is identified to not be entrained by the vacuum tube assembly. For example, a target object is an object that is desired to be removed/separated out of the material stream and further processed (e.g., bundled with other like objects and/or recycled). Specific instances of target objects that can be entrained by the vacuum tube assembly include thin film (e.g., plastic bags, plastic films, paper, newspaper), smaller items (e.g., bottle caps), and/or deformable materials. For example, sensors such as cameras or near-infrared sensors can be placed near the material stream to capture sensed data on the material stream. Then, a sorting control device is configured to input the sensed data into one or more machine learning models that have been trained to, at least, identify the location and/or other attributes of the objects within the sensed data. The sorting control device will compare the determined object attributes to sets of target object criteria to identify target objects among the material stream for which sensed data was captured. In some embodiments, the sorting control device is further configured to track the (e.g., predicted) trajectory of the target objects (e.g., as they are being transported across a conveyor device). In various embodiments, based on the identification of a target object and optionally, its trajectory, the sorting control device is configured to send a control signal to the vacuum tube assembly to cause at least a subset of the tubes to lower towards the target object (e.g., as it approaches a target area relative to the vacuum tube assembly) to entrain the target object through a capture operation.

In various embodiments, the capture parameters of the capture operation that is to be performed by the vacuum tube assembly on a particular target object are determined by the sorting control device using a "capture profile." As will be described in further detail below, a capture profile dictates a set of capture parameters that is to be implemented by the vacuum tube assembly for performing the capture operation on the target object. In some embodiments, the capture profile to use to perform a capture operation on a target object is determined by a machine learning model that has been trained on identifying the set of capture parameters that is configured to optimize the capture of objects associated with the attributes of that target object. Examples of capture parameters to be implemented by the vacuum tube assembly include one or more of the following: the selection of which tubes from the set of tubes to lower from a height associated with a ready state/position to perform the capture operation, the (e.g., positive or negative) direction of airflow that will be emitted from the selected tube(s), the pressure of the airflow that will be communicated through the selected tube(s), the location on the target object that the selected tubes will be targeting, the height relative to the conveyor device that the selected tube(s) will lower to in the capture state/position, and/or the length of time (which is sometimes referred to as the "dwell time") that selected tube(s) remain at the height associated with the capture state/position before returning to a height associated with the ready state/position.

In various embodiments, a clog (e.g., an obstruction, a blockage) in one or more tubes of the vacuum tube assembly is determined based on a feedback signal from a sensor that is placed within the assembly. For example, the sensor is a pressure or optical sensor that can be used to detect the presence of an object that has blocked objects from being entrained through the tubes. For example, a clog can be caused by one or more entrained objects in a tube that have failed to be drawn through the entire tube using the vacuum airflow. In response to the detection of a clog in the vacuum tube assembly, the sorting control device is configured to select a corresponding declogging profile. In some embodiments, the declogging profile is selected using a machine learning model that has been trained to choose a declogging profile that dictates declogging techniques (e.g., airflow parameters) that are optimized to remove the clog based on the detected type and/or location of the clog. To implement the declogging profile, the sorting control device is configured to send a control signal to the vacuum tube assembly to cause the vacuum tube assembly to adjust the airflow that is communicated through at least one of the tubes in an attempt to remove the clog (e.g., by forcing the clogged material to pass through either direction of the tube in which it was clogging).

FIG. 1 is a diagram showing an embodiment of a system for material removal comprising a vacuum tube assembly in a sorting facility. As shown in FIG. 1, system 100 includes objects in a material stream that are being transported along the Y-axis towards vacuum tube assembly 102. System 100 also includes sorting control device 114 and object recognition device 116. As described above, components within a sorting facility, such as, for example, sorting control device 114, vacuum tube assembly 102, and object recognition device 116, can be connected via one or more wired networks and/or one or more wireless networks. In the example of FIG. 1, vacuum tube assembly 102 is positioned over conveyor device 118 and is a sorting device that can actuate one or more of tubes 104a, 104b, and 104c along (but not necessarily exclusively) the Z-axis. Material identified by sorting control device 114 for removal from conveyor device 118 is referred to herein as "target objects." For example, an object may be identified for removal if it is identified to be of a target material type. Although waste products travelling on a conveyor belt are used as example target objects in the example embodiments described herein, it should be understood that in alternate implementations of these embodiments, the target objects need not be waste materials but may comprise any type of material for which it may be desired to sort and/or segregate. Moreover, although a conveyor belt is used as an example conveyance mechanism for transporting the target objects within reach of vacuum tube assembly 102, it should be understood that in alternate implementations of these embodiments, other conveyance mechanisms may be employed. For example, for any of the embodiments described below, in place of an active conveyance mechanism such as a conveyor belt, an alternate conveyance mechanism may comprise a chute, slide, or other passive conveyance mechanism through and/or from which material tumbles, falls, or otherwise is gravity fed as it passes by object recognition device 116.

Object recognition device 116 is directed at conveyor device 118 and is configured to capture information about objects on conveyor device 118 in order to discern target objects from non-target objects. For example, as described above, a "target object" is an object that is identified to meet a set of (e.g., dynamically configurable) target object criteria. For example, a set of target objects describes attributes (e.g., desired material type) associated with a target object. For example, a "non-target object" is an object that is identified to not meet the set of target object criteria. Object recognition device 116 is configured to capture information continuously (e.g., at a regular interval) and/or in response to a triggering event. Object recognition device 116 may comprise a vision sensor (such as, for example, an infrared camera, visual spectrum camera, or some combination thereof) directed at conveyor device 118. However, it should be understood that a vision sensor for object recognition device 116 is presented as an example implementation. In other embodiments, object recognition device 116 may comprise any other type of sensor that can detect and/or measure characteristics of objects on conveyor device 118. For example, object recognition device 116 may utilize any form of a sensor technology for detecting non-visible electromagnetic radiation (such as a hyperspectral camera, infrared, or ultraviolet), a magnetic sensor, a volumetric sensor, a capacitive sensor, a depth sensor (based on time of flight or stereoscopic imagery), or other sensors commonly used in the field of industrial automation. In some embodiments, object recognition device 116 is directed towards conveyor device 118 in order to capture object information from an overhead view of the materials being transported by conveyor device 118. Object recognition device 116 produces a sensed signal that is delivered to sorting control device 114. In a first example, the sensed signal that is delivered to sorting control device 114 from object recognition device 116 may comprise, but is not limited to, a visual image signal. In a second example, the sensed signal that is delivered to sorting control device 114 from object recognition device 116 may comprise, but is not limited to, a visual image signal and a non-visual signal.

Object recognition device 116 produces one or more sensed signals that are delivered to sorting control device 114 and which may be used by sorting control device 114 to identify target objects among the objects that are being transported along conveyor device 118. In various embodiments, sorting control device 114 is configured to apply machine learning models (e.g., obtained from a cloud sorting server, generated locally, and/or modified locally) to the sensed data captured by object recognition device 116 to determine a set of attributes associated with the objects. For example, the attributes determined for the objects may include one or more of the following: the object type, the material type of an object, the condition of the object, the clog potential of the object, and the chemical composition of the object. The attributes are compared to the set of target object criteria to determine target objects among the objects for which sensed data was captured. In some embodiments, sorting control device 114 is configured to determine a corresponding capture profile to use to perform a capture operation on a target object. The capture profile can dictate capture parameters (e.g., which tubes to lower, how much vacuum force is to be applied, the dwell time of the selected tubes in the lowered height/capture state, the location on the target object on which to direct the airflow) that are to be used in performing the capture operation. After identifying target objects among the materials transported along conveyor device 118 and their corresponding capture profiles, sorting control device 114 is configured to send instructions (e.g., control signals) to vacuum tube assembly 102 to instruct vacuum tube assembly 102 to actuate one or more of tubes 104a, 104b, and 104c towards conveyor device 118 and to use a vacuum airflow (that is generated by air source 110) to perform a capture operation on the target object(s) in accordance with the capture profiles. For example, air source 110 comprises a pressured air source that is configured to produce pressurized vacuum airflow or positive airflow to flow through tubes 104a, 104b, and/or 104c either constantly or in response to triggers to start/stop airflow. The entrained/captured target object(s) would travel upwards through tubes 104a, 104b, and/or 104c and be drawn into collection container 120.

Because conveyor device 118 is continuously moving (e.g., along the Y-axis) and transporting objects (e.g., such as objects 122 and 108) towards vacuum tube assembly 102, the trajectories (e.g., along the X- and Y-axes) of target objects 122 and 108 are continuously changing. As such, object recognition device 116 is configured to continuously capture object information (e.g., image frames) that shows the updated positions of the target objects (e.g., such as objects 122 and 108) and send the captured object information to sorting control device 114. In various embodiments, sorting control device 114 is configured to use the sensed data captured by object recognition device 116 to determine trajectories (e.g., along conveyor device 118) of the identified target objects. In some embodiments, the trajectories of the identified target objects can then be used by sorting control device 114, vacuum tube assembly 102, and/or other sorting control device(s)/sorting device(s) of the sorting facility to determine a timing as to when the target objects might enter target area 106 of conveyor device 118. In various embodiments, target area 106 comprises a region of conveyor device 118 that is proximate enough to tubes 104a, 104b, and/or 104c of vacuum tube assembly 102 such that tubes 104a, 104b, and/or 104c can be lowered closer to the target objects and entrain them via the vacuum force that is provided by air source 110. For example, sorting control device 114 is configured to send a control signal (e.g., that describes the capture parameters of the selected capture profile) to vacuum tube assembly 102 to trigger the capture operation and where the control signal includes the timing of when a target object is to enter target area 106.

Vacuum tube assembly 102 includes set of tubes 104a, 104b, and 104c that are suspended over the surface of conveyor device 118. While set of tubes 104a, 104b, and 104c of vacuum tube assembly 102 includes three tubes, in other examples, vacuum tube assembly 102 may include less than three tubes or more than three tubes. While not shown in FIG. 1, vacuum tube assembly 102 includes actuation mechanisms that are configured to translate each of tubes 104a, 104b, and 104c closer or farther away from the surface (e.g., where Z=0) of conveyor device 118. For example, the actuation mechanism can actuate each tube independently of the other tubes. The actuation mechanism that is used to actuate the vacuum tubes could be achieved using any number of methods. For example, the vacuum tube stage could be coupled to a ball screw driven by a servo motor, a directly coupled linear motor, a cam-shaft coupled to an electric or pneumatic system, or a rack and pinion type drive. Individual tubes or groups of tubes may be moved through any of these mechanisms. As described above, vacuum tube assembly 102 is configured to receive instructions (e.g., control signals) from sorting control device 114 to perform capture operations on target objects that are moving into or have already entered target area 106 of conveyor device 118. As described above, the received control signals describe capture parameters that dictate how vacuum tube assembly 102 is to perform each capture operation. As will be described in further detail below, in various embodiments, vacuum tube assembly 102 can actuate each tube (e.g., tubes 104a, 104b, and 104c) between at least two states: the capture state and the ready state. The "capture state" involves lowering a tube (along the Z-axis) closer to the surface of conveyor device 118 so that the suction force channeled through the tube is closer to a target object and is therefore stronger and more likely able to entrain the target object. The "ready state" involves raising the tube (along the Z-axis), while the tube is in between capture operations/states, higher and farther away from the surface of conveyor device 118 so that due to the greater distance between the end of the tube and the surface of conveyor device 118, the suction force, if any, that is channeled through the tube is less strong and less likely to entrain non-target objects that are to pass under vacuum tube assembly 102. Furthermore, raising a tube from the capture state to the ready state also allows the raised tube to provide greater clearance to non-target objects passing by and minimizes the chance that such objects can collide with the tube and damage it. For example, the end of a tube of vacuum tube assembly 102 that is closer to the surface of conveyor device 118 when the tube is in the capture state is in a range of heights (along the Z-axis) that is closer to the surface of conveyor device 118 relative to a range of heights (along the Z-axis) that the end of the tube is in when the tube is in the ready state. As shown in the example of FIG. 1, tube 104c is currently lowered to be in the capture state to perform a capture operation on object 108 to entrain object 108 while tubes 104a and 104b are raised and in the ready state as they are not actively performing capture operations on target objects.

In some embodiments, sorting control device 114 is configured to receive a feedback signal from a sensor that is located inside (e.g., one or more tubes 104a, 104b, and 104c of) vacuum tube assembly 102 indicating that a clog has been detected. As described above, a clog is a blockage/obstruction that is detected in a tube of vacuum tube assembly 102 that could be caused by objects that are entrained in the tube but that do not pass through the entire tube and therefore become stuck within the tube. A clog can prevent an entrained target object from being drawn into collection container 120, prevent enough vacuum airflow to flow through a tube, and generally degrade the material removal/sorting capabilities of vacuum tube assembly 102. For example, the sensor can be a pressure sensor or an optical sensor. In response to the feedback signal indicating the presence of a clog, sorting control device 114 is configured to select a declogging profile (e.g., using machine learning) to apply to declog (remove) the detected clog. The declogging profile can dictate one or more declogging techniques (e.g., airflow parameters) that can be used to potentially remove the clog. In some embodiments, sorting control device 114 is configured to send a control signal (e.g., that describes the airflow and/or other parameters of the selected declogging profile) to vacuum tube assembly 102 to trigger vacuum tube assembly 102 to vary the airflow through at least one of its tubes to force the clogged materials to pass through either end of the tube(s) in which it was stuck.

While not shown in FIG. 1, in some embodiments, sorting control device 114 can be located within the same housing as vacuum tube assembly 102.

Figure 2:
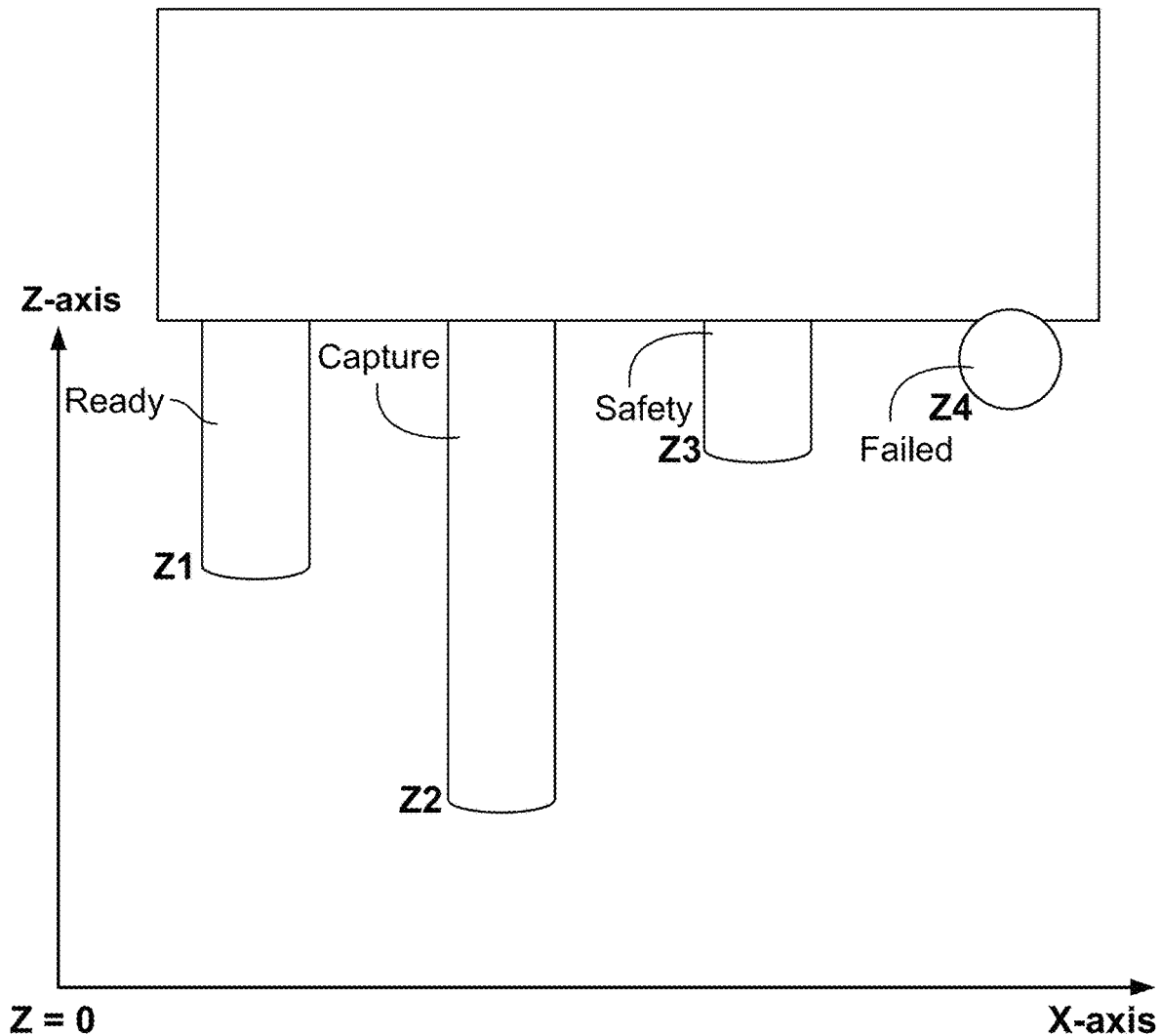
FIG. 2 is a diagram showing four example states that a tube in a vacuum tube assembly can be in, in accordance with some embodiments.

FIG. 2 is a diagram showing four example states that a tube in a vacuum tube assembly can be in, in accordance with some embodiments. For example, any one of tubes 104a, 104b, and 104c of vacuum tube assembly 102 of system 100 of FIG. 1 can, at any time, be in one of the four states described in FIG. 2. FIG. 2 shows four tubes in a vacuum tube assembly in four possible states: ready, capture, safety, and failed. In the example of FIG. 2, Z=0 of the Z-axis is the surface of the conveyor device on which a material stream is transported. At each of the four states (ready, capture, safety, and failed), the lower end of the tube that is pointed downwards towards Z=0 (the surface of the conveyor device) is at a different height relative to Z=0. An actuation mechanism (that is not shown) can actuate a tube in the vacuum tube assembly to a height (e.g., to a location on the Z-axis but not necessarily actuated exclusively along the Z-axis) associated with a state in response to an event. In some embodiments, each state is associated with a fixed height (e.g., a fixed location along the Z-axis). In some embodiments, each state is associated with a range of heights (e.g., a range of locations along the Z-axis). In various embodiments, a tube is in the ready state (e.g., the lower end of the tube is at height Z1) before the tube is actuated downwards to enter the capture state (e.g., the lower end of the tube is at height Z2) to perform a capture operation on a target object and then returned to the ready state after the tube has performed the capture operation. In some embodiments, each height in the possible range of height Z1 associated with the ready state is greater than each height in the possible range of height Z2 associated with the capture state. This is because to improve the chance of a successful capture operation, the suction force that is applied by the tube against target objects needs to be increased by moving the tube closer down towards the target object that is resting at Z=0. After the capture operation has been completed, the tube can be raised back to a height associated with the ready state so that the suction force that is applied by the tube against objects on the belt of the conveyor device (if the vacuum airflow has not ceased) is reduced so as to not inadvertently entrain a non-target object and also to provide more clearance for non-target objects that are passing under the vacuum tube assembly. In some embodiments, the length of time that a tube stays at the height (this is sometimes referred to as a "dwell time") that is associated with a capture state before it is actuated back to a height associated with a ready state can be determined by a capture parameter that is dictated by the capture profile that has been determined by the sorting control device that is configured to send control signals to the vacuum tube assembly. In some embodiments, the dwell time that a tube stays at the height associated with the capture state can also be dynamically determined by the sorting control device based on attributes of the target objects that are currently in the target area of the conveyor device or the target objects that are about to enter the target area of the conveyor device, and may at least in part be a function of the conveyance device speed.

Besides the ready state and the capture state, a tube can be raised to a height associated with a safety state to provide greater clearance in response to a detected large object that is to pass under the vacuum tube assembly. For example, an object that is determined by a sorting control device to be a "large object" based on sensed data obtained by an object recognition device is one that may not be desired to be captured by the vacuum tube assembly and/or an object whose dimensions may cause the object to collide with one or more tubes of the vacuum assembly unless the tube(s) were to be raised to a height (Z3) greater than a height (Z1) associated with the ready state. In some embodiments, each height in the possible range of height Z3 associated with the safety state is greater than each height in the possible range of height Z1 associated with the ready state.

In some embodiments, the fourth state that a tube of the vacuum tube assembly can enter is the failed state. For example, a tube can be actuated into the fourth state if an error has been detected for the tube that would render it unusable to entrain target objects. As shown in the example of FIG. 2, a tube can enter the failed state by rotating about the higher of its ends and actuating the rotated tube to a height (Z4) that is greater than height (Z3) associated with the safety state. After the failed tube has been repaired, it can be rotated and actuated back into one of the other states (e.g., ready, capture, or safety). In an alternate embodiment, the failed state position Z4 may simply be the highest value possible for the system without requiring a rotation.

In some embodiments, the vacuum tube assembly includes the use of a depth sensor to establish the height of the material flowing under the collection system, such that the vacuum tube actuation distance is adaptive (while in any state, but in particular, the capture state) to the height of the material flowing under it at any given time (e.g., so that a vacuum tube does not collide with the material stream).

In some embodiments, two or more tubes within the same vacuum tube assembly can each be in different states or the same state at the same time.

Figure 3:
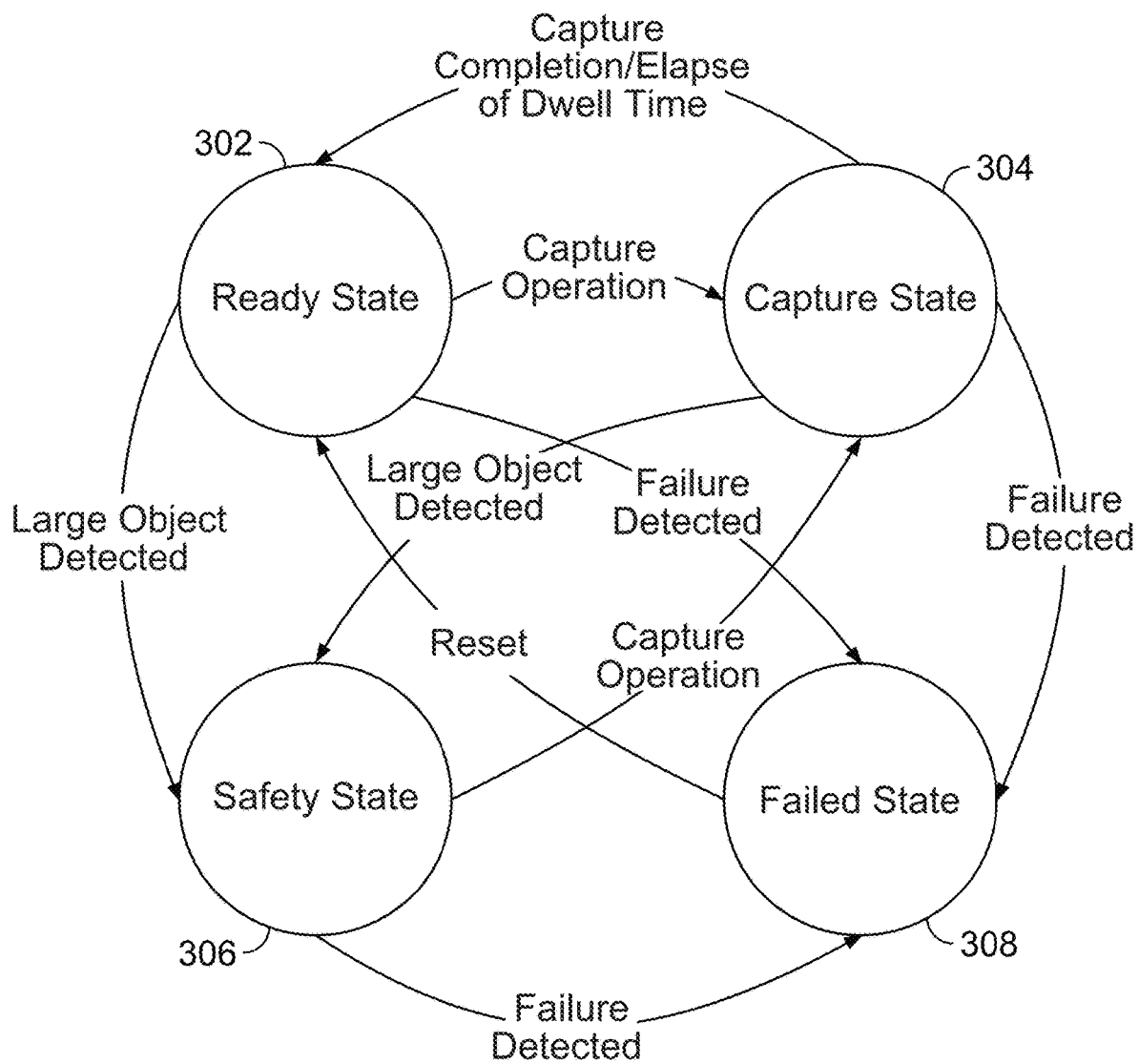
FIG. 3 is a diagram showing an example of a state diagram describing the four example states that each tube of a vacuum tube assembly can be in and the events that can cause the vacuum tube assembly to transition the tube from one state to another, in accordance with some embodiments.

FIG. 3 is a diagram showing an example of a state diagram describing the four example states that each tube of a vacuum tube assembly can be in and the events that can cause the vacuum tube assembly to transition the tube from one state to another, in accordance with some embodiments. For example, any one of tubes 104a, 104b, and 104c of vacuum tube assembly 102 of system 100 of FIG. 1 can, at any time, be in one of the four states described in FIG. 3.

A tube in ready state 302 (and having been actuated to a height in a range of heights associated with ready state 302) can be transitioned to (e.g., actuated to a height in a range of heights associated with) capture state 304 in response to an instruction (e.g., from the sorting control device) to use the tube to perform a capture operation on a target object. A tube in ready state 302 (and being actuated to a height in a range of heights associated with ready state 302) can be transitioned to (e.g., actuated to a height in a range of heights associated with) safety state 306 in response to an indication (e.g., from the sorting control device) that a large object (e.g., that should pass under the vacuum assembly) in the material stream has been detected. A tube in ready state 302 (and having been actuated to a height in a range of heights associated with ready state 302) can be transitioned to (e.g., actuated to a position associated with) failed state 308 in response to an indication (e.g., from the sorting control device) that an error has been detected with respect to that tube.

A tube in capture state 304 (and having been actuated to a height in a range of heights associated with capture state 304) can be transitioned to (e.g., actuated to a height associated with) ready state 302 in response to an indication (e.g., from the sorting control device) that the capture operation has completed and/or the elapse of the dwell time at ready state 302. A tube in capture state 304 (and having been actuated to a height in a range of heights associated with capture state 304) can be transitioned to (e.g., actuated to a height in a range of heights associated with) safety state 306 in response to an indication (e.g., from the sorting control device) that a large object (e.g., that should pass under the vacuum assembly) in the material stream has been detected. A tube in capture state 304 (and having been actuated to a height in a range of heights associated with capture state 304) can be transitioned to (e.g., actuated to a position associated with) failed state 308 in response to an indication (e.g., from the sorting control device) that an error has been detected with respect to that tube.

A tube in safety state 306 (and having been actuated to a height in a range of heights associated with safety state 306) can be transitioned to (e.g., actuated to a height associated with) capture state 304 in response to an instruction (e.g., from the sorting control device) to use the tube to perform a capture operation on a target object. A tube in safety state 306 (and having been actuated to a height in a range of heights associated with safety state 306) can be transitioned to (e.g., actuated to a position associated with) failed state 308 in response to an indication (e.g., from the sorting control device) that an error has been detected with respect to that tube.

A tube in failed state 308 can be transitioned to (e.g., actuated to a height in a range of heights associated with)

ready state 302 in response to a resetting of the tube after it has been successfully repaired.

Figure 4A:
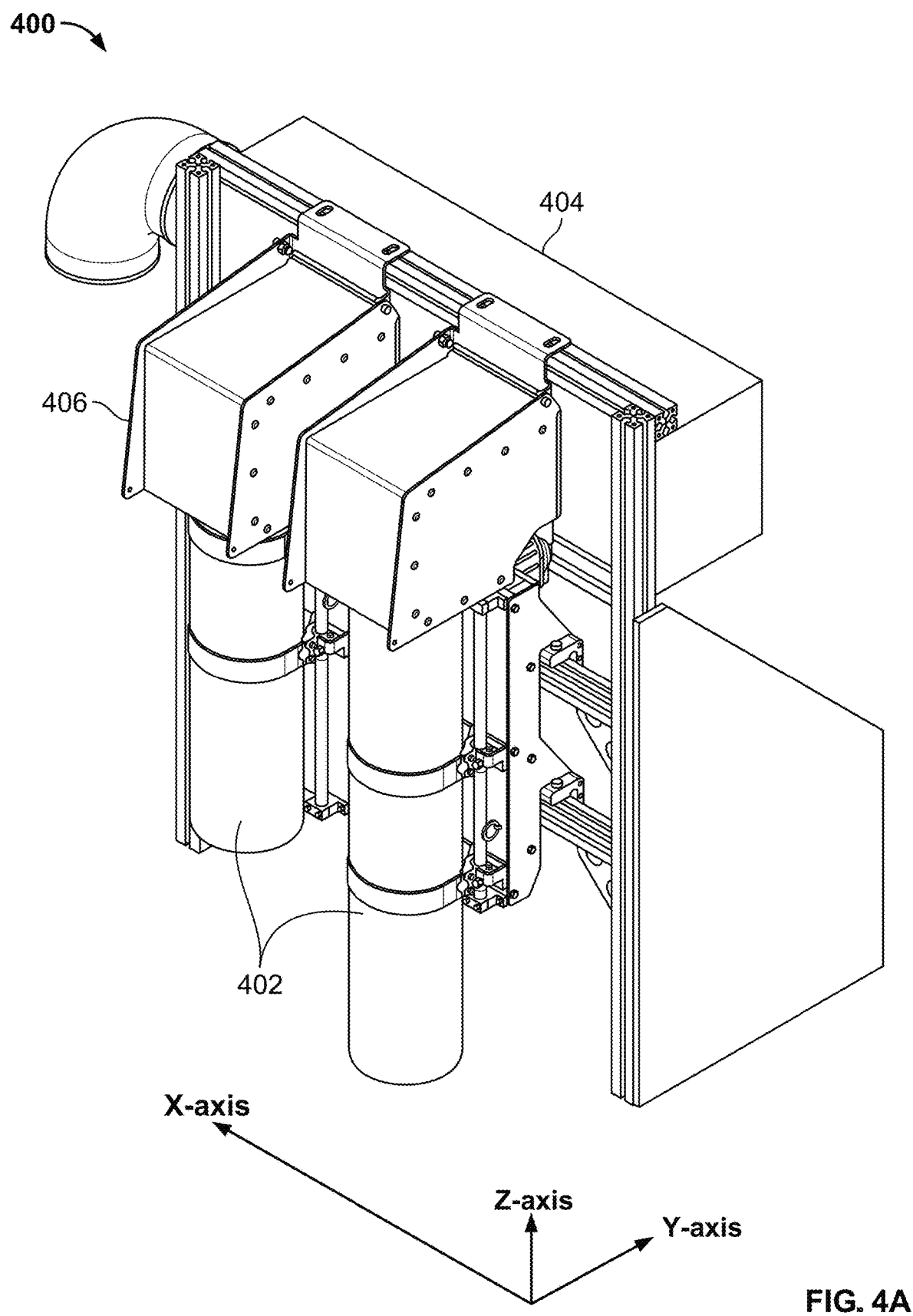
FIG. 4A is a diagram showing an example of a vacuum tube assembly for material removal in accordance with some embodiments.

FIG. 4A is a diagram showing an example of a vacuum tube assembly for material removal in accordance with some embodiments. Vacuum tube assembly 400 shown in FIG. 4A utilizes a series of two actuated tubes 402 coupled to an air source (not shown), which supplies a vacuum airflow through plenum 404 and hood 406. In some embodiments, vacuum tube assembly 102 of system 100 of FIG. 1 can be implemented using the example of vacuum tube assembly 400 shown in FIG. 4A.

FIG. 4B is a diagram showing a side view of the example of the vacuum tube assembly for material removal that was shown in FIG. 4A.

FIG. 4C is a diagram showing a cross section view of the example of the vacuum tube assembly for material removal that was shown in FIG. 4A. In the example vacuum tube assembly of FIG. 4C, vacuum airflow flows through plenum 404 and then through tubes 412 and 414. As shown in the cross-section view of FIG. 4B, when tube 412 has been actuated upwards to the ready state such that its upper end is proximate to (e.g., be flush against) the top of hood 406, tube 412 is closed to the vacuum system because the top of tube 412 effectively seals or restricts the vacuum airflow through tube 412. As an individual tube or a plurality of tubes is actuated down to the capture state, such as tube 414 as shown in FIG. 4C, the top of tube 414 is open to plenum 404 and is therefore exposed to the vacuum system. Air will then flow through the tube into plenum 404, generating a vacuum effect at the end of the tube. Thin film (e.g., plastic bags), or other light materials, in close proximity to the end/bottom of tube 414 will be entrained in the airflow and be sucked into tube 414 and through plenum 404. In some embodiments, the vacuum system (not shown in FIG. 4C) is coupled to a cyclone separator (not shown in FIG. 4C) that separates the thin film or other light material from the stream of air running to the vacuum blower (or other vacuum generator) and deposits it in a collection container (not shown in FIG. 4C). In some embodiments, the cyclone separator can also be coupled to a rotary air separator or auger separator to extract the thin film or other light material from the collection bin. In some embodiments, the air stream can also flow through a shredder to shred and reduce the size of the material entrained in the air before extraction.

While tubes 412 and 414 are shown to be straight cylindrical tubes, in some embodiments, tubes 412 and 414 could be curved in nature and actuated in part via a rotational motion.

Figure 5:
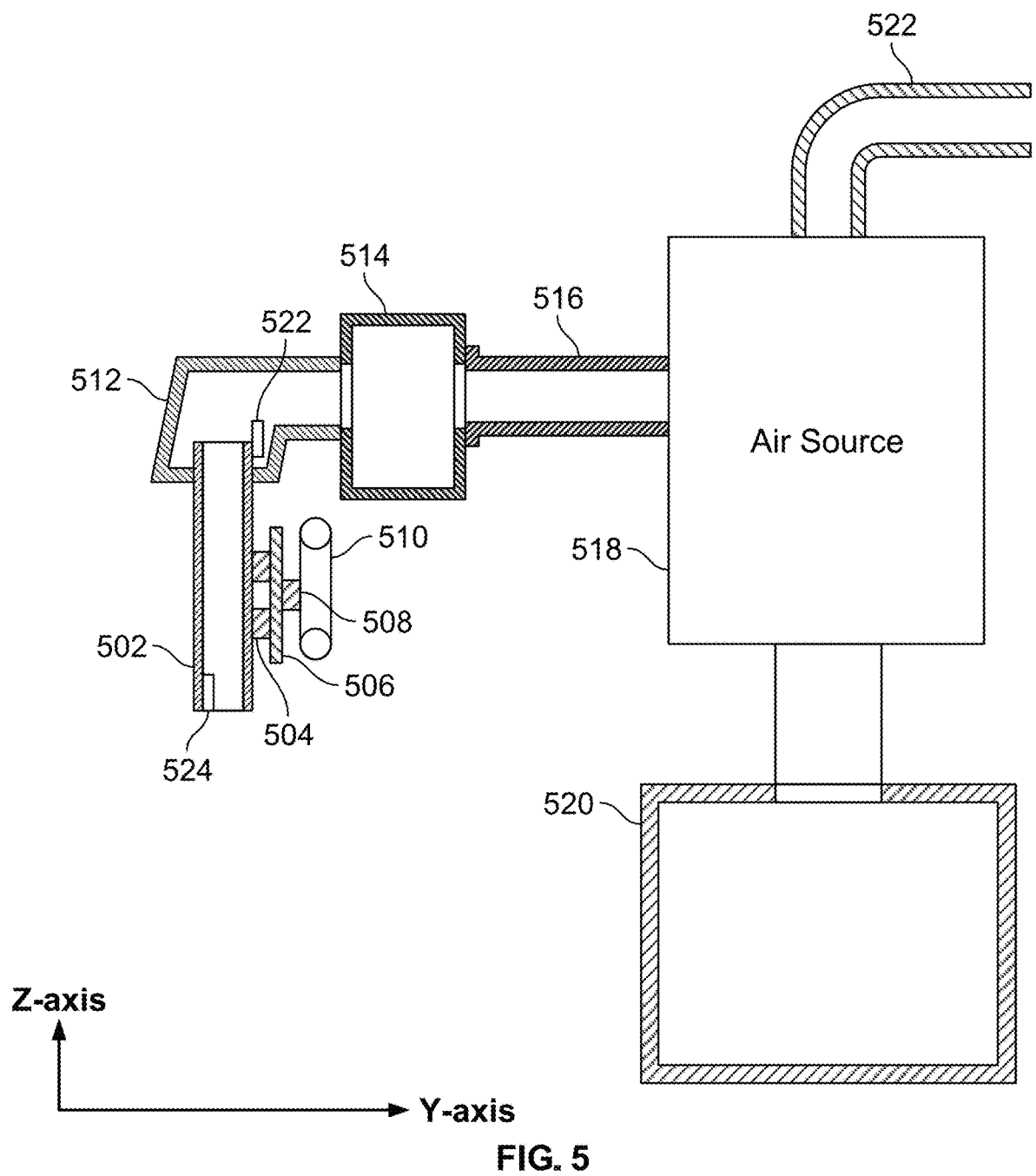
FIG. 5 is a diagram showing an example connection between a vacuum tube assembly and a corresponding air source and collection container in accordance with some embodiments.

FIG. 5 is a diagram showing an example connection between a vacuum tube assembly and a corresponding air source and collection container in accordance with some embodiments. In some embodiments, vacuum tube assembly 102 of system 100 of FIG. 1 can be connected to an air source and collection container similar to how the example vacuum tube assembly of FIG. 4A is connected to its corresponding air source and collection container. Referring to FIG. 5, vacuum tube 502 of the shown vacuum tube assembly in the capture state is coupled to linear stage 506 through mounting brackets 504. Linear stage 506 is coupled to belt and pulley system 510 through bracket 508. Belt and pulley system 510 are driven by a motor system (not shown) that can be driven in either an open loop or closed loop position control. Put another way, the motor system (not shown), belt and pulley system 510, and bracket 508 form an actuation mechanism that is configured to actuate vacuum tube 502 along the Z-axis. One end of vacuum tube 502 moves within hood 512 coupled to plenum 514 along with any number of other hood and actuated tube systems (not shown) of the vacuum tube assembly. In the example of FIG. 5, plenum 514 is coupled to air source 518 by a section of rigid or flexible ducting 516. For example, air source 518 comprises a vacuum generator such as a Venturi or Coanda system that communicates a vacuum airflow that causes a suction force to be pulled through the vacuum tubes (including vacuum tube 502) of the vacuum tube assembly. In some examples, air source 518 comprises a vacuum generator and also a generator of positive airflow that can be pushed through the vacuum tubes (including vacuum tube 502) of the vacuum tube assembly. Objects that are entrained through vacuum tube 502 via the vacuum airflow that is channeled by vacuum tube 502 pass through to collection container 520. The method of vacuum generation could be achieved by any number of methods. Example methods are blower fans, Venturi generators coupled through the output of blower fans, or Venturi systems driven by compressed air systems. In some embodiments, multiple blowers/inducers are utilized for each vacuum tube, with a global inducer providing general vacuum assistance. Flapper valves (passive or active) may be used to actuate individual tubes. In some embodiments, the vacuum tube assembly further includes cyclonic separators and standard vacuum filtration/sump collection systems (e.g., like a shop vacuum arrangement). To prevent clogs, a mulcher/chopper may be utilized in-line, prior to the blower/inducer motor assembly.

As shown in FIG. 5, vacuum tube 502 includes clog sensors 522 and 524 that are configured to provide feedback signals that are used to determine whether a clog in vacuum tube 502 has been detected. For example, each of sensors 522 and 524 is a pressure sensor or an optical sensor. While sensor 522 is shown to be placed in hood 512 at the upper end of vacuum tube 502 and sensor 524 is shown to be placed outside hood 512 near the lower end of vacuum tube 502, clog sensors can be placed anywhere inside a vacuum tube assembly such that they can detect clogs through a sensed change in a measured reading (e.g., of pressure or light). If an object that is entrained into vacuum tube 502 becomes stuck inside the tube and does not pass through, then sensors 522 and/or 524 will detect that a clog is present within vacuum tube 502. The clog needs to be removed or else it will degrade the suction force that is emitted from the lower end of vacuum tube 502 and ultimately decrease the probability that vacuum tube 502 can successfully perform capture operations on target objects.

While not shown in the example of FIG. 5, a cyclone separator can be coupled to collection container 520. In some embodiments, collection container 520 could be replaced with a rotary air separator or an auger separator if it was desired to extract the material without disrupting operation of the cyclone separator and air source 518. The cyclone separator (not shown) can be coupled to a vacuum source (not shown) through duct system 522 that can be either a rigid or flexible duct. For example, the vacuum system could be the intake port of a blower, a Venturi system driven through compressed air, or any other source of vacuum airflow(s). In some embodiments, the cyclone separator (not shown) is coupled to methods to create reverse airflow or a break in the vacuum by injecting compressed air or reversing the airflow of the blower. Smooth, flowing interfaces may be used in the vacuum system tubing to minimize clogs.

In some embodiments, a pneumatic system is used as the actuation mechanism that is to actuate (move) the vacuum tubes (e.g., in response to a control signal from the sorting control device). A double-acting piston may be used here to control dwell time, or the actuation mechanism may develop an air pressure profile (i.e., a time-based, variable pressure) to optimize the vacuum tube movement from a height associated with the capture state and back to a ready state. Such a profile may incorporate parameters designed to minimize the force of impact of the vacuum tubes against taller objects traversing the belt.

In some embodiments, the air conveyance in the vacuum tube assembly could be coupled through a flexible hose instead of through hood 512 and plenum 514. Running the vacuum tube through hood 512 and plenum 514 decouples the moving mass of a hose from the actuated system and decreases the amount of mass that must be moved by the motion system. This will, in general, allow the vacuum tube system to be actuated faster than a hose coupled system.

To constrain undesirable motion of the vacuum tubes, some embodiments incorporate various devices to constrain motion directions. In some, rails are provided with bearings, enabling the vacuum tube or tubes to translate in one dimension without altering their profile in other directions. In some embodiments, a vacuum tube is embedded in a fixed piston housing with linear bearings around the tube. In some embodiments, a rotational system may be used to actuate each vacuum tube into a position (e.g., associated with the ready state); a rotational bearing and central shaft constrain unwanted motion. Springs (coil, torsion, air springs, etc.) may be used to reset the vacuum tube assembly once actuated, enabling a passive vacuum tube assembly to ensure retraction of tubes after a collection action is taken.

Figure 6:
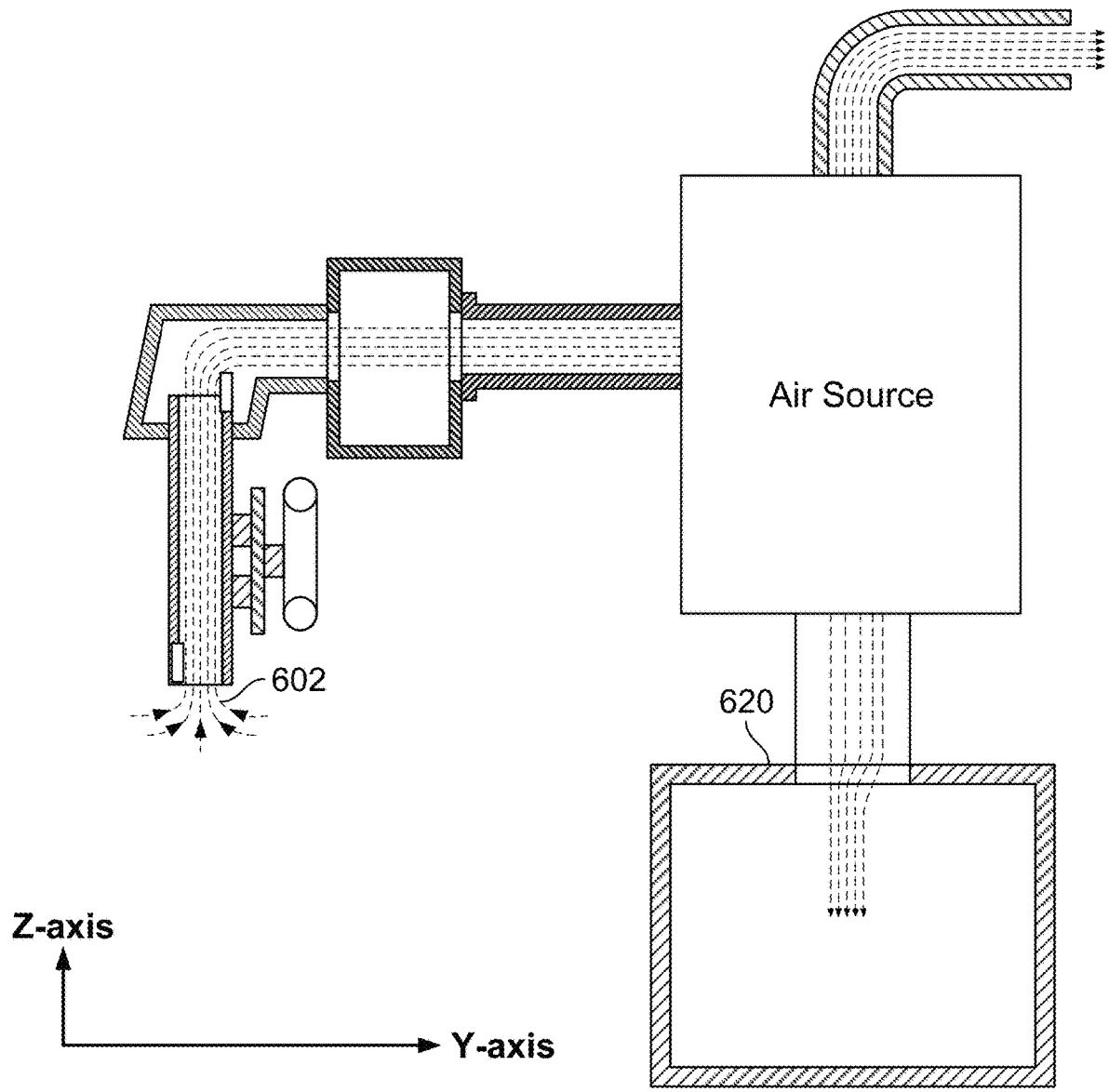
FIG. 6 is a diagram showing an example of a vacuum airflow flowing through the vacuum tube assembly, when the vacuum airflow is in operation, in accordance with some embodiments.

FIG. 6 is a diagram showing an example of a vacuum airflow flowing through the vacuum tube assembly, when the vacuum airflow is in operation, in accordance with some embodiments. In some embodiments, the vacuum airflow can be channeled through the vacuum tube assembly 102 of system 100 of FIG. 1 similar to how vacuum airflow 602 is channeled through the example vacuum tube assembly of FIG. 6. As shown in the example of FIG. 6, a tube has been actuated downwards to be in the capture state (to be closer to the material stream) to, for example, capture a target object. Similar to the example vacuum tube assembly shown in FIGS. 4A, 4B, 4C, and 5, in FIG. 6, due to the lowering of the vacuum tube, the restriction between the top of the tube and the hood opens and the vacuum airflow is allowed through the tube. As such, in some embodiments, when the vacuum tube has been actuated downwards from the ready state to the capture state (to be closer to the material stream), the vacuum system is considered to be in operation and as a result, vacuum airflow is channeled through the vacuum tube to suction/pull objects into the vacuum tube and ultimately towards collection container 620. In some embodiments, when the vacuum tubes are in the ready state at the top of travel, they are in a position that restricts flow of air through the assembly due to the close proximity or actual contact with the top wall of the hoods, as shown in the example of FIG. 4C. This would be when the vacuum system is considered to not be in operation. This position also permits heavier materials still in the tube to drop free upon the cessation of vacuum force.

While the examples of the vacuum tube assembly that are described across FIGS. 4A, 4B, 4C, 5, and 6 describe that vacuum airflow may cease flowing through a vacuum tube when the vacuum tube is actuated into a certain position/state/height, in other embodiments, the vacuum airflow does not cease flowing through a vacuum tube regardless of its position/state/height.

Figure 7:
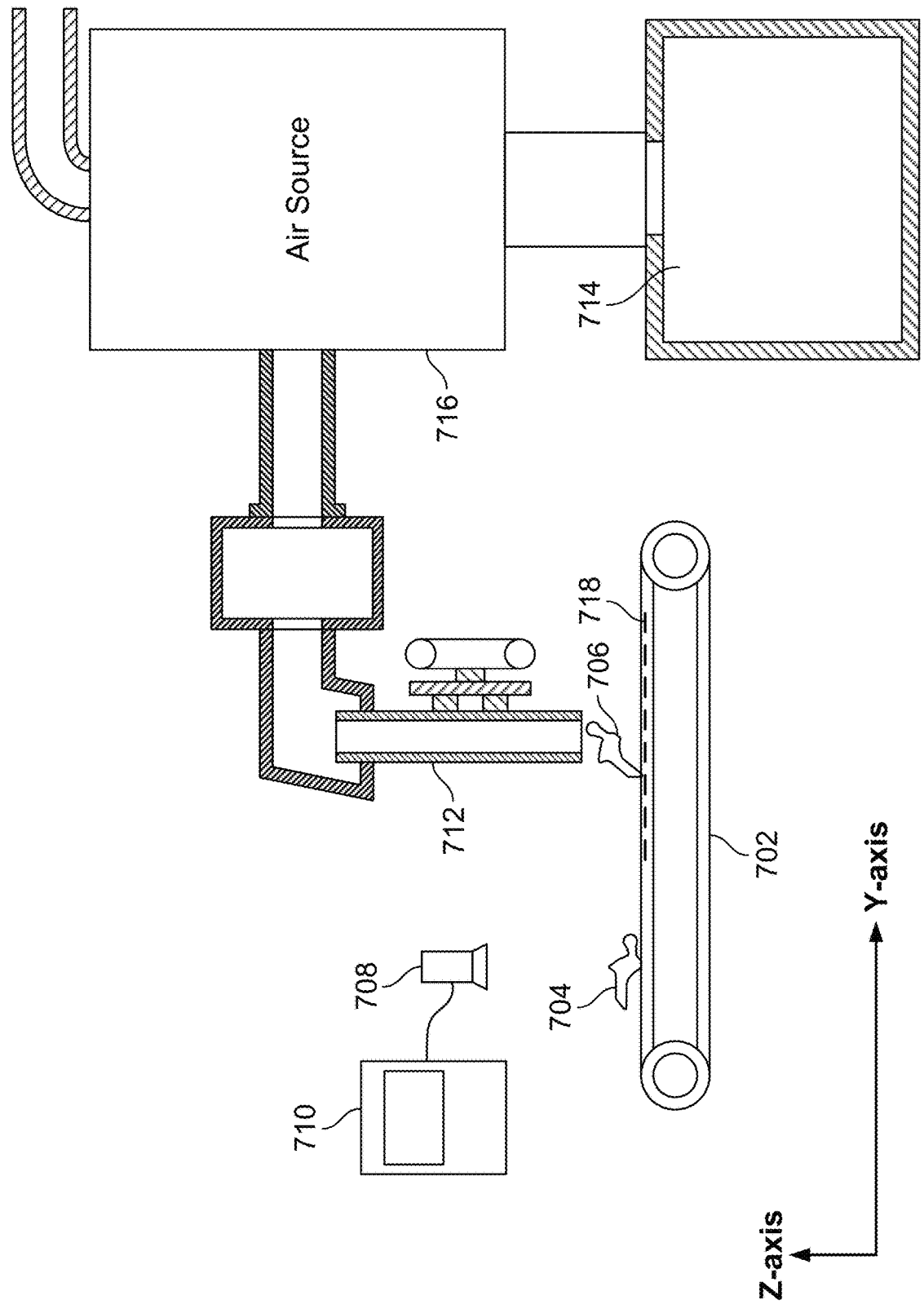
FIG. 7 is a diagram showing an example of a placement of a vacuum tube assembly over a material stream on a conveyor device in accordance with some embodiments.

FIG. 7 is a diagram showing an example of a placement of a vacuum tube assembly over a material stream on a conveyor device in accordance with some embodiments. In some embodiments, vacuum tube assembly 102 of system 100 of FIG. 1 can be placed over the material stream similar to how the example vacuum tube assembly of FIG. 7 is placed over the material stream. As objects (such as 704 and 706 of the material stream) travel into the field of view of object recognition device 708 (e.g., a camera or a near infrared (NIR) sensor), sorting control device 710 is configured to run a local or connected cloud-based artificial intelligence (e.g., machine learning, neural network) identification program that is configured to determine the attributes of the objects that are sensed on conveyor device 702. In some embodiments, if an object's attributes match a set of target object criteria, then the object is determined to be of a type to be targeted and as a result, sorting control device 710 will relay a control signal to the motor controller (not shown) of vacuum tube assembly 712. In some embodiments, the control signal can be generated based on a capture profile that sorting control device 710 has selected corresponding to the attributes associated with the target object and where the capture profile dictates the capture parameters that are to be used by vacuum tube assembly 712 to capture the target object. In some embodiments, the control signal can further be generated based on sorting control device 710's tracking of the target object's trajectory and where the tracking will be used to predict the time at which the target object will enter target area 718 of conveyor device 702. As such, for example, the control signal sent by sorting control device 710 to vacuum tube assembly 712 could indicate to vacuum tube assembly 712 a time delay, if applicable, for performing the capture operation on the target object to account for the time it takes the target object (e.g., object 706) to travel from the camera field of view to target area 718. In response to the control signal, a selected vacuum tube of vacuum tube assembly 712 will be actuated to lower (e.g., to a height associated with the capture state) and use a vacuum force at the bottom of the tube to entrain the target object (e.g., object 706). In some embodiments, sorting control device 710 may be located in the same device vacuum tube assembly 712. As the target objects travel on conveyor device 702 into target area 718 under vacuum tube assembly 712, they will become entrained in the air stream (generated by air source 706) moving into the vacuum tube and be conveyed into vacuum tube assembly 712 and deposited into collection container 714. In some embodiments, the lowered vacuum tube will be actuated upwards back to a height associated with the ready state after the lowered vacuum tube stays at a height associated with the capture state (e.g., for a dwell time that was indicated in the capture profile). In a first example, the dwell time that the lowered vacuum tube stays at a height associated with the capture state is user configured (e.g., to be 0 to 1 seconds long). In a second example, the dwell time that the lowered vacuum tube stays at a height associated with the capture state can be dynamically determined based on a detected material type associated with the target object and/or dynamically learned from historical successes/failures of the historically used delays.

FIGS. 8, 9, 10A, 10B, 11A, 11B, 11C, and 11D, which will be described below, each show example optional features that can be implemented in a vacuum tube assembly to improve the chances that a target object will be entrained by one or more vacuum tubes and/or decrease the chance that a clog will form inside the vacuum tube assembly.

Figure 8:
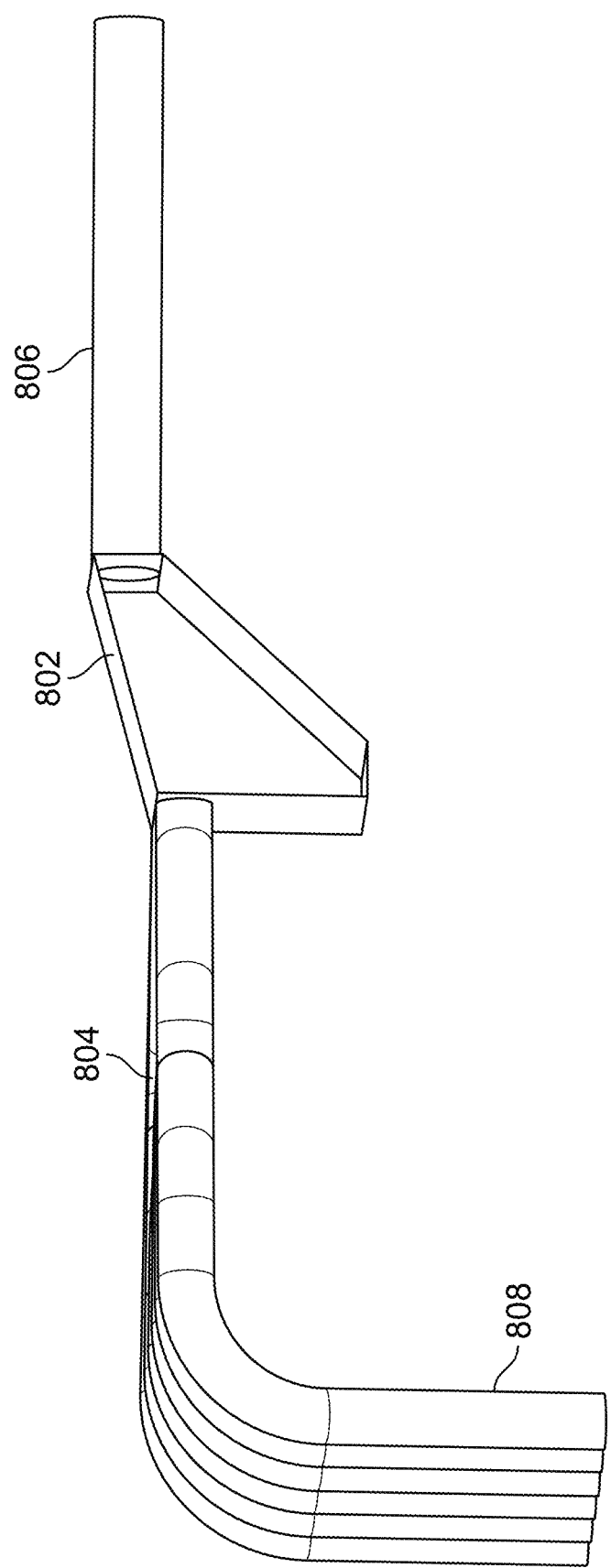
FIG. 8 is a diagram showing an example of a gravity trap that is connected to the tubes of a vacuum tube assembly in accordance with some embodiments.

FIG. 8 is a diagram showing an example of a gravity trap that is connected to the tubes of a vacuum tube assembly in accordance with some embodiments. FIG. 8 shows gravity trap 802, which is an example of a collection area that can be connected to the top of vacuum tubes 808 of a vacuum tube assembly and is configured to receive/collect heavier objects that become entrained through vacuum tubes 808 but drop out of the entrained flow due to their weight. Gravity trap 802 is connected to the top of the vacuum tubes via ducts 804 and is also connected to duct 806, which is connected to an air source (that is configured to generate vacuum airflow) (not shown) and also a collection container (not shown) that is configured to receive target objects. Due to the vacuum force flowing through vacuum tubes 808, ducts 804, gravity trap 802, and duct 806, a stream of objects that is entrained by a vacuum tube of vacuum tubes 808 could pass through the vacuum tube, ducts 804, gravity trap 802, duct 806, and land inside the collection container (not shown). For example, the collection area such as gravity trap 802 can be (optionally) attached to a vacuum tube assembly in a manner such as the one shown in FIG. 8 in the event that the desired objects to be targeted/captured/entrained by the vacuum tube assembly and ultimately collected at a collection container (not shown) are generally light such as thin films (e.g., plastic bags) and/or smaller objects (e.g., paper, plastic accessories). Even though thin films and/or lightweight objects among the material stream are identified using sensors pointed at the material stream and by a sorting control device, as described herein, as target objects to be captured by the vacuum tubes, in some instances, non-target objects (e.g., heavy objects or dense objects) may get inadvertently entrained into vacuum tubes 808 from time to time. It is undesirable to allow non-target objects to be deposited into the collection container (not shown) because the presence of non-target objects in a collection container would lower the overall purity of the objects collected at the container. However, by adding gravity trap 802 between the ducts (ducts 804 and 806) that lead from vacuum tubes 808, heavier objects that are presumably not target objects could drop out (due to gravity) from the object stream that has been entrained through vacuum tubes into gravity trap 802 and therefore, become prevented from landing in the collection container (not shown). In a specific example, objects that are targeted by the vacuum tube assembly could be thin films and so non-target objects such as small rocks that get entrained through vacuum tubes 808 could drop out into gravity trap 802 before they are pulled by the vacuum airflow through duct 806 and onwards towards the collection container (not shown). In this specific example, target objects such as plastic bags that are entrained through vacuum tubes 808 are too light weight to drop into gravity trap 802 and would likely be pulled by the vacuum airflow through duct 806 and onwards into the collection container (not shown). The presence of gravity trap 802 has the additional advantage of preventing heavier objects that could clog duct 806 from entering duct 806.

Figure 9:
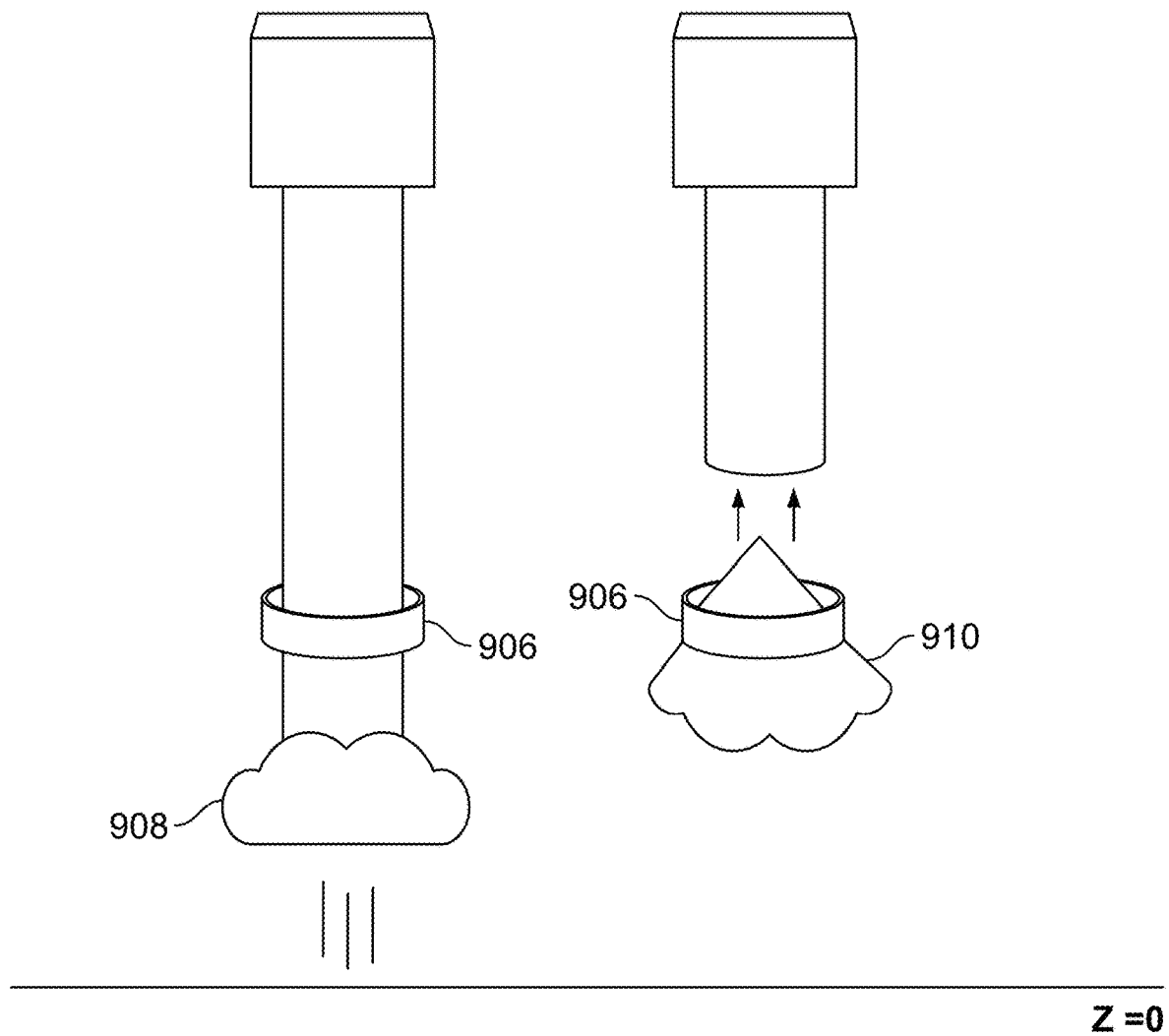
FIG. 9 is a diagram showing an example of a clearing ring that a vacuum tube of a vacuum tube assembly can travel through in accordance with some embodiments.

FIG. 9 is a diagram showing an example of a clearing ring that a vacuum tube of a vacuum tube assembly can travel through in accordance with some embodiments. As shown in FIG. 9, clearing ring 906 is placed in the path of a vacuum tube of the vacuum tube assembly's travel (e.g., along the Z-axis closer or farther away from the material stream below) as the tube is translated between the capture state and the ready state. While not shown in FIG. 9, clearing ring 906 can be secured to a portion of the vacuum tube assembly so that it remains in a substantially static location (e.g., along the Z-axis). The purpose of clearing ring 906 is to remove items (e.g., plastic film, paper) that cover at least a portion of the lower end of the tube from the end of the tube so that the material can potentially compress into a shape that is more likely to become entrained into the tube via the suction force of the vacuum airflow. As shown in the example of FIG. 9, a plastic film has become stuck over the lower end of the vacuum tube in shape 908 after the tube was lowered (e.g., to a height associated with the capture state) in an attempt to entrain the plastic film using the vacuum airflow. In shape 908, the plastic film appears to have spread out and covered at least a portion of the lower end of the vacuum tube. Thanks to clearing ring 906, as the vacuum tube retracts upwards (e.g., to a height associated with the ready state), the plastic film is pushed by clearing ring 906 off of the tube's end and also folds into a more compressed shape, shape 910, and which then is suctioned through clearing ring 906 and into the tube via the suction force.

While not shown in FIG. 9, clearing ring 906 may incorporate an end cap that can be used to temporarily seal the vacuum tube end. In the event of a clog in the vacuum tube, the sorting control device can signal an actuator to seal the end of the tube with the cap temporarily, while simultaneously boosting airflow pressure to that tube. The pressure boost may be a simple increase in overall system pressure, or it could be augmented by redirecting pressure from other tubes (e.g., by closing their valves/ends). Once vacuum pressure has built, the actuator can remove the end cap, causing a large amount of flow to be forced through the clogged tube.

In some embodiments, to prevent the chances of a clog by a material that may cover a vacuum tube's end, a knife edge may be incorporated at the vacuum tube end or be incorporated at a clearing ring end to cut unwanted or larger materials, or active spinning wheels may be utilized to both facilitate ingestion but also push material through.

Figure 10B:
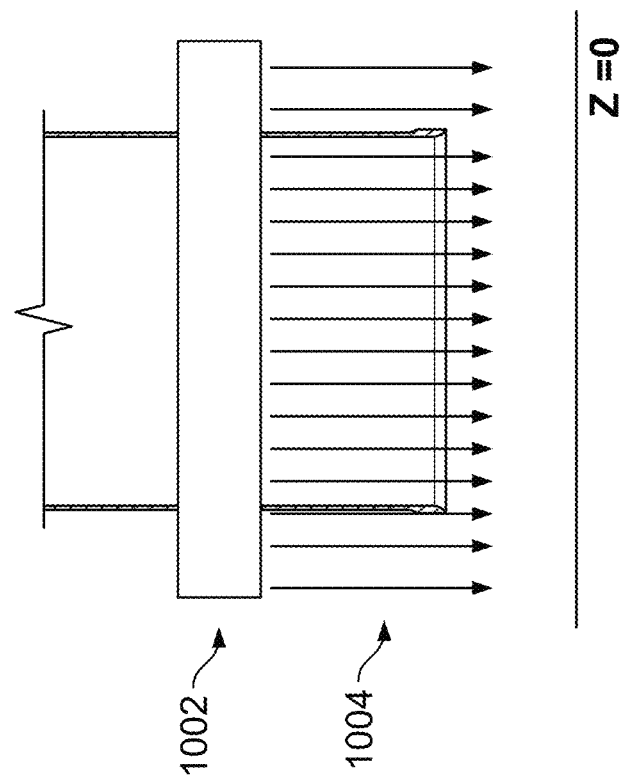
FIGS. 10A and 10B are diagrams showing different views of arrays of air orifices that can be placed proximate to vacuum tubes of a vacuum tube assembly in accordance with some embodiments.
Figure 10A:
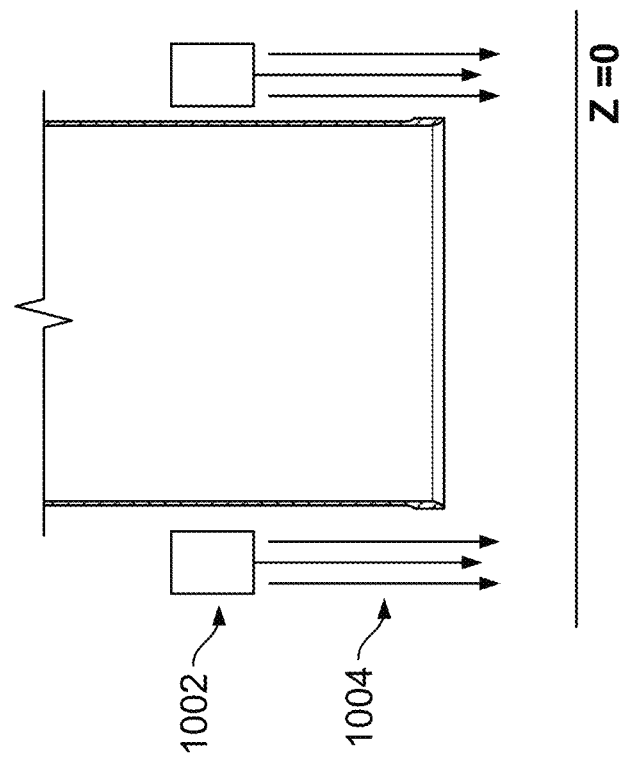

FIGS. 10A and 10B are diagrams showing different views of arrays of air orifices that can be placed proximate to vacuum tubes of a vacuum tube assembly in accordance with some embodiments. To prevent bridging of a material across multiple tubes, one or more arrays of air orifices (which are sometimes referred to as "air curtains") that are pointing down towards the surface of the conveyor device (Z=0) can be placed in between vacuum tubes in the vacuum tube assembly. Positive and pressurized airflow can be emitted from the arrays of air orifices to cause material deformation (e.g., cause a plastic film to fold) to better fit in the tube. FIG. 10A shows the cross-section view of a tube that is flanked by two arrays of air orifices 1002, which can be triggered to direct positive airflow 1004 downwards towards the surface of the conveyor device to prevent the bridging of objects across adjacent tubes and/or to deform the objects so that their compressed shapes can better fit into the tube. FIG. 10B shows the front view of the same vacuum tubes and its accompanying arrays of air orifices that were shown in FIG. 10A.

Alternative to the air curtains shown in FIGS. 10A and 10B, a physical separation between adjacent vacuum tubes in a vacuum tube assembly can be used to prevent bridging of material across multiple tubes. As another alternative to the air curtains, the sorting control device may instruct the vacuum tube assembly to direct positive air flow out from vacuum tubes that neighbor a vacuum tube that is using a negative/vacuum airflow to entrain a target object in order to prevent simultaneous capture across multiple tubes (i.e., the bridging of the material across multiple tubes).

Figure 11D:
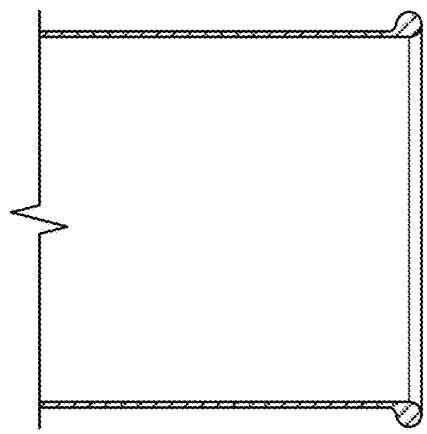
FIGS. 11A, B, C, and D each show an alternative example of the end of a vacuum tube that is pointing down towards the material stream in accordance with some embodiments.
Figure 11C:
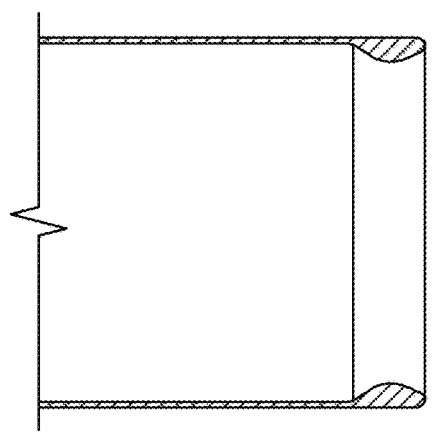
Figure 11B:
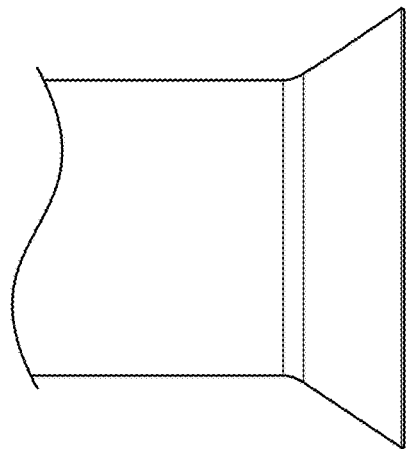
Figure 11A:
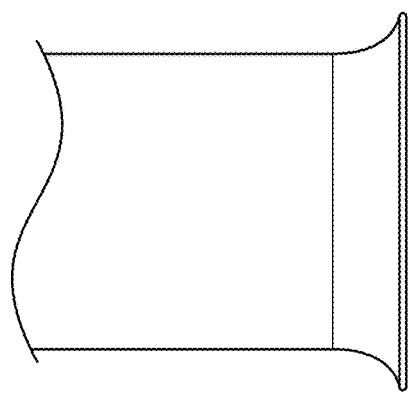

FIGS. 11A, B, C, and D each show an alternative example of the end of a vacuum tube that is pointing down towards the material stream in accordance with some embodiments. A flared end can facilitate the capture of lighter objects, or larger objects that might become stuck in the entry point by providing a larger opening. FIG. 11A shows a vacuum tube end in a trombone shape. FIG. 11B shows a vacuum tube end in a funnel shape. FIG. 11C shows a vacuum tube end that is concave but then flares out. FIG. 11D shows a vacuum tube end with a small-flared lip.

Other examples of vacuum tube ends that are not shown in FIGS. 11A, 11B, 11C, and 11D include a flower petal with a "V" notch, which encourages material folding, a conical end flaring to a trombone shape, a straight or flared tube with a non-perpendicular cut across the end (resulting in an oval-shaped opening), and multiple openings at the end of the nozzle to apply reduced pressure for lighter objects and objects on the sides of the tube. Other embodiments include modifications to the tip of the vacuum tube, for example, adding a radius to the tip that may be significantly larger than the tube wall width, thereby discouraging material from catching on the edge of the tube. In another embodiment, the end radius of the tube flares out and around to take advantage of the Coanda effect, enabling a smooth flow along the edge of the surface. In some embodiments, a vacuum tube does not flare or have a modified end, but the clearing ring (e.g., such as clearing ring 906 of FIG. 9) that is attached or collocated with the tube incorporates one of these flared or radiused options. Such an embodiment may provide better manufacturability and allow for a variety of such ends to be used in a system.

While not shown in a diagram, multiple techniques may be used to optimize capture at the vacuum tube end. In some embodiments, arrays may be equipped with electrostatics to capture light plastic materials that easily build up static electrical charge. In some embodiments, techniques are utilized to minimize or even negate the static electricity effects of thin-walled plastic material (e.g., thin film product bags). For example, a grounding system may be connected to the vacuum tube or the array of vacuum tubes, or the vacuum tubes may be coated with an anti-static material. As mentioned above, positive airflow may be vented from vacuum tubes that are adjacent to a vacuum tube that is performing a capture operation to assist in the capture of objects. In this way, by individually addressing vacuum tubes within an array, a capture profile may be developed to optimize the target capture of light objects within a subset region spanned by the array.

In some embodiments, the ends of a vacuum tube include an articulated end-effector (e.g., suction cup, gripper, magnetic, etc.) to attract or grasp materials and position them in proximity to the vacuum tube for removal.

In some embodiments, where there are multiple vacuum tubes (e.g., in an array) in a vacuum tube assembly, a subset of the tubes can be selected to be lowered by the actuation mechanism to target a particular target object. For example, a sorting control device that is in communication with the vacuum tube assembly is configured to determine which vacuum tube(s) will be actuated downwards due to the determined location of the target object within the field of view (e.g., of one or more sensors associated with an object recognition device). Each vacuum tube has a "radius of influence" and if the sorting control device determines that the target object will be advancing through the radius of a particular tube, then the sorting control device can output a digital trigger/control signal to (e.g., a processor included in) the tube assembly to cause the vacuum tube assembly to actuate that particular individual tube. In some embodiments, the radius of influence is programmable and can be overlapped with adjacent tubes. Therefore, it is possible that two or more tubes will actuate at the same time.

In some embodiments, another issue resolved by a vacuum tube assembly is that of conveyance jams caused by the capture mechanism. To eliminate impingement on larger moving objects, multiple approaches can be provided for the vacuum tubes. In some embodiments, a vacuum tube end can be designed to separate in the event of impact, preventing blockage. In some embodiments, the vacuum tube end may be designed to be flexible (like a "noodle") so that it bends when impacted by large or tall objects. Note that in this scenario, "noodle" vacuum tubes may be interspersed in the system and not require any motion to capture objects as they will bend out of the way of unwanted larger items, but only activate their vacuum flow when a target capture is desired. In some embodiments, pre-screens may be positioned ahead of the vacuum capture area, shunting larger objects out of the capture zone. As mentioned above, vision-based sensors and/or beam sensors may also be utilized to identify large objects prior to engagement with the vacuum system area.

In various embodiments, the diameter of a vacuum tube is in the range of 4 to 8 inches. In some embodiments, depending on the material type to be extracted and the other material in the stream, the diameter of a vacuum tube can be less than 4 inches or greater than 8 inches.

In some embodiments, each vacuum tube is circular, octagonal, or square, to enable varying degrees of packing for multi-tube arrays.

In some embodiments, the spacing between adjacent vacuum tubes is dependent on the diameter of tubes, the vacuum flow rate, and/or the desired resolution of material extraction. For example, finer discernment between close adjacent materials will require a smaller tube diameter with a closer pitch between tubes. In some embodiments, vacuum tubes are spaced from 2 to 20 inches. In various embodiments, vacuum tubes are spaced from 6 to 15 inches.

In some embodiments, the number of actuated vacuum tubes in a vacuum tube assembly is dependent on the width of the material stream flowing under the assembly. In some embodiments, the range of widths of the material stream is 2 to 10 feet. In various embodiments, the range of widths of the material stream is 3 to 6 feet. In other embodiments, an additional vacuum (e.g., blower, Venturi, or otherwise) stage or stages are incorporated into the vacuum tube to impart additional force to move the materials greater distances.

In some embodiments, the travel of the vacuum tubes could vary from 1 to 20 inches. In various embodiments, the travel of the vacuum tubes is 1 to 12 inches. In some embodiments, the "travel of the vacuum tubes" is the distance that the tubes will actuate downward (toward the material stream) (e.g., to a height associated with the capture state from a height associated with the ready state) to pick a target object. For this example, this distance can be programmable up to the hard limits of the motion system. For example, the travel of the vacuum tubes can be set based on one or more factors, including but not limited to: a pre-programmed distance, a sensed proximity to material or an underlying surface, and a learned distance based upon material type. The travel of the vacuum tube allows larger pieces of unwanted material to flow under the vacuum tube assembly without being obstructed by the vacuum tubes.

In some embodiments, an array of tubes in a vacuum tube assembly is spaced evenly or staggered to provide more complete coverage of the full width of the conveyor device that is configured to transport a material stream under the assembly. The vacuum tubes may be equally sized or have different diameters suitable for targeting of different materials or objects of different sizes/weights. By way of example, smaller tubes may be actuated to entrain smaller, denser objects and large tubes may be actuated to entrain lighter, and potentially larger objects. Arrays may be created such that sections of the array (e.g., a row) are optimized for specific material types. In some embodiments, a linear diagonal array (diagonal across the width of the belt of the conveyor device) may be used to reduce interference between vacuum tubes as they are triggered to be actuated for different objects located at assorted positions across the belt of the conveyor device (i.e., the X-axis, or width of the belt). In some embodiments, the sorting control device selects one or more vacuum tubes to effectuate a capture operation on a target object based upon a combination of the target object's material type and the dimensions of the selected vacuum tube to actuate.

In some embodiments, the vacuum tubes of a vacuum tube assembly can be placed directly over a conveyor device or at the transition between conveyor devices, such that the tubes overhang one conveyor device. In some embodiments, the vacuum tube assembly can be placed over any other type of material conveyance system such as walking floors or disc screens. In other embodiments, tubes or tube arrays can be placed at the side or end of a conveyance device, and be actuated to obtain materials at the side or dropping from the end of a belt. In this way, lightweight objects may be easily captured using a waterfall type of approach.

In some embodiments, blower jets may be combined with the vacuum tube assembly to more easily agitate and manipulate lightweight objects. Blower jets may be positioned to the side of a belt or even under a mesh belt, agitating lighter materials and causing them to float upwards, where the vacuum tubes can more easily capture them.

In some embodiments, one or more vacuum tubes of a vacuum tube assembly maintain a constant airflow with no need for an airflow valve, and the control action to initiate a capture is directed to motion of the tube towards an object (e.g., along the Z-axis, which is perpendicular to the conveyance device, or any other combination of directions necessary).

In some embodiments, the end of the vacuum tubes includes a compliant member (e.g., such as a suction cup) to allow the vacuum tube assembly to collide with rigid pieces of objects from the material stream without taking damage to the vacuum tubes or to the actuation system. In some embodiments, the vacuum tubes are provided with flexible ends ("noodles"), and may be positioned just above the flow of materials to allow them to absorb any collision with objects from the material stream. Vacuum tubes are actuated by directing the vacuum through the tube (as described above) and the tubes do not need to move exclusively in the Z-axis direction (i.e., vertically) to capture target objects. In the event that the vacuum tubes receive an impact by a large object on the conveyor device, the vacuum tubes with flexible ends can simply bend out of the way and snap back into place.

Figure 12:
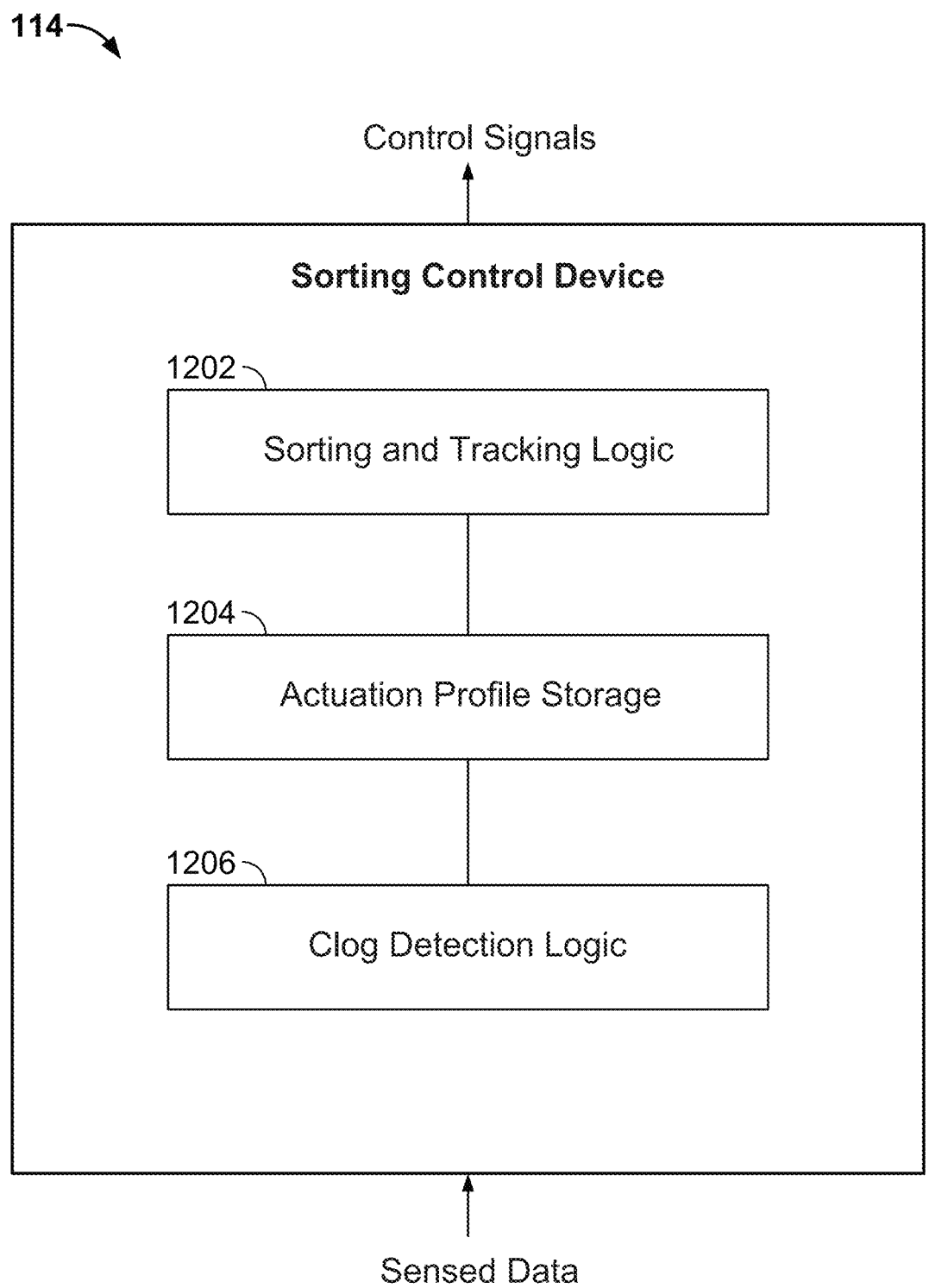
FIG. 12 is a diagram showing an example sorting control device in accordance with some embodiments.

FIG. 12 is a diagram showing an example sorting control device in accordance with some embodiments. In some embodiments, sorting control device 114 of system 100 of FIG. 1 can be implemented using the example sorting control device of FIG. 12. In FIG. 12, the example sorting control device includes sorting and tracking logic 1202, actuation profile storage 1204, and clog detection logic 1206. Sorting and tracking logic 1202 and clog detection logic 1206 can be implemented using hardware (e.g., a processor) and/or software. In some embodiments, actuation profile storage 1204 may be implemented using any appropriate type of storage medium.

Sorting and tracking logic 1202 is configured to receive sensed signals from object recognition devices (e.g., comprising one or more sensors) that are capturing information regarding a material stream. In some embodiments, the material stream comprises objects that are being transported by a conveyor device towards a vacuum tube assembly that is configured to remove target objects from the conveyor device. In some embodiments, one or more sensors of one or more sensor types (e.g., an infrared camera, visual spectrum camera, volumetric sensor, or some combination thereof) are used to capture information. Sorting and tracking logic 1202 is configured to input the sensed signals into one or more machine learning models (e.g., neural networks) to determine attributes associated with the objects, sense dimensional characteristics (e.g., height) associated with the objects, and/or determine trajectory and bounding polygon (e.g., box) information associated with the objects. In some embodiments, the machine learning models are trained on images or other sensed data of objects that are annotated with the location and/or attributes of the objects that appear within the sensed data. In some embodiments, the machine learning models are obtained from a remote cloud server and/or updated/generated locally. In some embodiments, the machine learning recognized object attributes are used to determine one or more of the following regarding each object: a type, a material, a chemical composition, a condition (e.g., deformed, wet, and/or torn), a potential for clogging the vacuum tube assembly, and a determination of whether the dimensions of the object meet a criteria of being a large object that should prompt the vacuum tubes to be raised to avoid a collision with the object. In some embodiments, the machine learning recognized object attributes are compared against a (e.g., dynamically reconfigurable) set of target object criteria to determine whether an object matches the criteria and is therefore a target object (or whether an object does not match the criteria and is therefore a non-target object). In some embodiments, sorting and tracking logic 1202 is further configured to incorporate a dynamic model (e.g., PID, PI, or Kalman Filter) to estimate track speed or object trajectory (e.g., speed and location) associated with each machine learning recognized (e.g., target) object. In some embodiments, sorting and tracking logic 1202 is configured to use the tracked speed or trajectory of the objects to determine an approximate time at which the objects are to enter the target area that is proximate to the vacuum tube assembly. For example, sorting and tracking logic 1202 can use the approximate time at which the objects are to enter the target area to generate a control signal to the vacuum tube assembly that specifies a suggested time and/or at which to perform a capture operation on a target object, or an instruction to raise one or more vacuum tubes to a height that is associated with the safety state to avoid a collision with a detected large object.

In some embodiments, the object recognition capabilities of sorting and tracking logic 1202 may be used to select a capture profile (e.g., stored by actuation profile storage 1204) to use for the capture operation of a target object. By way of example, standard field training data may be used to train a neural network to recognize a set of target objects to be captured by the vacuum tube assembly. Using machine learning techniques, target objects (e.g., and variants and aberrations of these objects) may also be identified and stored in a database used by the neural network in object identification. Based on user input or additional machine learning-based training, a set of capture parameters may be created for each target object (e.g., and its variants and aberrations) as well as each type of a set of target objects (e.g., a cluster of closely situated target objects and/or a series of target objects) (e.g., that increase the probability that a capture operation performed on the target object will be successful). Examples of capture parameters may include, but are not limited to, a selection or number of vacuum tubes to use in a capture operation, an airflow pressure profile to be used in the capture operation, a location profile specific to capturing a particular target type, and a dwell time that the vacuum tubes should remain at a height associated with the capture state. For example, a large thin film object may require a single vacuum tube, but positioned farther from the conveyor device. Alternatively, a conglomeration of loose micro-plastic materials may require the full array of vacuum tubes to actuate simultaneously, much closer to the conveyor device. Also, for example, certain materials may be captured more effectively with a different pressure profile, such as, for example, a low pressure vacuum to start, building to high pressure as the object becomes entrained, and tapering at the end to prevent unwanted objects from piggybacking along with the desired target object.

Sorting and tracking logic 1202 is configured to send a control signal to the vacuum tube assembly to indicate which target objects to capture. In some embodiments, in addition to instructing the vacuum tube assembly which target objects to capture, sorting and tracking logic 1202 is configured to send capture parameters (e.g., based on selected capture profiles, as described above) to use in performing a capture operation on each target object and/or a time (e.g., based on the tracked speed/trajectory of the objects) at which to perform the capture operation on each target object. In some embodiments, the vacuum tube assembly includes a processor, microprocessor, and/or local controller that is configured to use the control signals to activate the airflow and/or actuation mechanism of the vacuum tubes accordingly to perform capture operations on target objects that were recognized by sorting and tracking logic 1202. In some embodiments, a machine learning model of sorting and tracking logic 1202 is configured to identify material configurations likely to clog a tube or an array of vacuum tubes. The training data may include vision and hyperspectral data and correlated capture results from one or more test or production systems. In production, the machine learning model may identify the material to the control system, along with capture parameters (e.g., specify to avoid object, or specify different capture techniques based on the neural training). In some embodiments, the machine learning model identifies the target object type and clog potential, and the control system adjusts its parameters to maximize capture success. For example, the machine learning vision system may recognize a sheet of thin film plastic that spans 50% of the width of the belt. Because this configuration frequently causes a bridged capture between one or more tubes, the control system activates only the tube closest to the material and suppresses other tubes in order to prevent the bridged capture.

Actuation profile storage 1204 is configured to store capture profiles and declogging profiles. In some embodiments, the capture profiles and declogging profiles can be generated locally or received from a remote, cloud server. As described above, in various embodiments, a capture profile describes capture parameters to be implemented by a vacuum tube assembly during capture operations of objects associated with one or more designated attributes. In some embodiments, a capture profile is generated for objects of one or more designated attributes by using machine learning and/or historical capture operation statistics to determine sorting parameters that result in a high chance of successfully entraining such objects into the vacuum tube assembly. In some embodiments, sorting parameters associated with a capture operation that are dictated in a capture profile may include, but are not limited to, one or more of the following: a selection of which subset of vacuum tubes from the vacuum tube assembly that are to be activated during a capture operation, a pressure profile (e.g., the direction and/or force of airflow that is to be emitted by the selected vacuum tube(s) of the vacuum tube assembly), a location on the object on which to direct airflow from the selected vacuum tubes, a height/depth to which the selected vacuum tubes should be lowered (e.g., along the Z-axis) during the capture state, a dwell time at which the selected vacuum tubes should remain at the lowered height/depth associated with the capture state, and whether an air curtain is to be activated. In some embodiments, capture profiles can correspond to designated attributes associated with a set of objects. For example, the set of objects can be objects that are closely clustered together or a sequence of objects that are located close together.

In some embodiments, a declogging profile describes declogging techniques that are to be implemented by a vacuum tube assembly to attempt to remove a clog that has been detected in the vacuum tube assembly. For example, a clog can be detected within a vacuum tube of the vacuum tube assembly, the plenum of the vacuum tube assembly, the hood of the vacuum tube assembly, and/or ducting that runs between the vacuum tube assembly and the collection container. In some embodiments, declogging techniques may include, but are not limited to, one or more of the following: a reversal in the direction of airflow (e.g., from vacuum airflow into the vacuum tubes to positive airflow out of the vacuum tubes), the actuation of a cover over at least one of the vacuum tubes to build pressure in those vacuum tube(s), and/or the activation of one or more mechanical elements (e.g., a retractable plunger) that are configured to push out clogged objects from a vacuum tube. In some embodiments, a declogging profile is generated for clogs by using machine learning and/or historical declogging statistics to determine declogging techniques that result in a high chance of successfully removing a (e.g., particular type/location of) clog.

Clog detection logic 1206 is configured to detect when a clog has occurred with respect to a vacuum tube assembly. In some embodiments, the clog can be detected by a (e.g., pressure and/or optical) sensor that is located within the vacuum tube assembly. For example, if the clog sensor detects a change in a measured metric (e.g., air pressure or light) that deviates beyond a threshold amount, then clog detection logic 1206 can detect a clog based on a feedback signal from the clog sensor. In some embodiments, clog detection logic 1206 is configured to infer the type of clog and/or the location of the clog based on the location of the clog sensor that had reported the feedback signal indicating the clog. In response to the detection of the clog, clog detection logic 1206 is configured to select a corresponding declogging profile (e.g., stored at actuation profile storage 1204) and send a control signal to the vacuum tube assembly to instruct the vacuum tube assembly to perform the declogging techniques described in the declogging profile. In some embodiments, clog detection logic 1206 is configured to send the control signal to the vacuum tube assembly to perform the declogging techniques in response to a triggering event. For example, the triggering event can be the detection of a clog or the detection that no target objects will be entering the target area for the vacuum tube assembly for at least a predetermined period of time (e.g., so that the vacuum tube assembly can perform maintenance activity such as declogging without interruption to its normal operation of sorting target objects).

While FIG. 12 shows sorting and tracking logic 1202, actuation profile storage 1204, and clog detection logic 1206 being part of a sorting control device that is separate from the vacuum tube assembly, in some other embodiments, one or more of sorting and tracking logic 1202, actuation profile storage 1204, and clog detection logic 1206 can be located within the vacuum tube assembly to locally provide control signals to cause the vacuum tube assembly to actuate its vacuum tubes, change the airflow, and/or activate declogging mechanisms.

Figure 13:
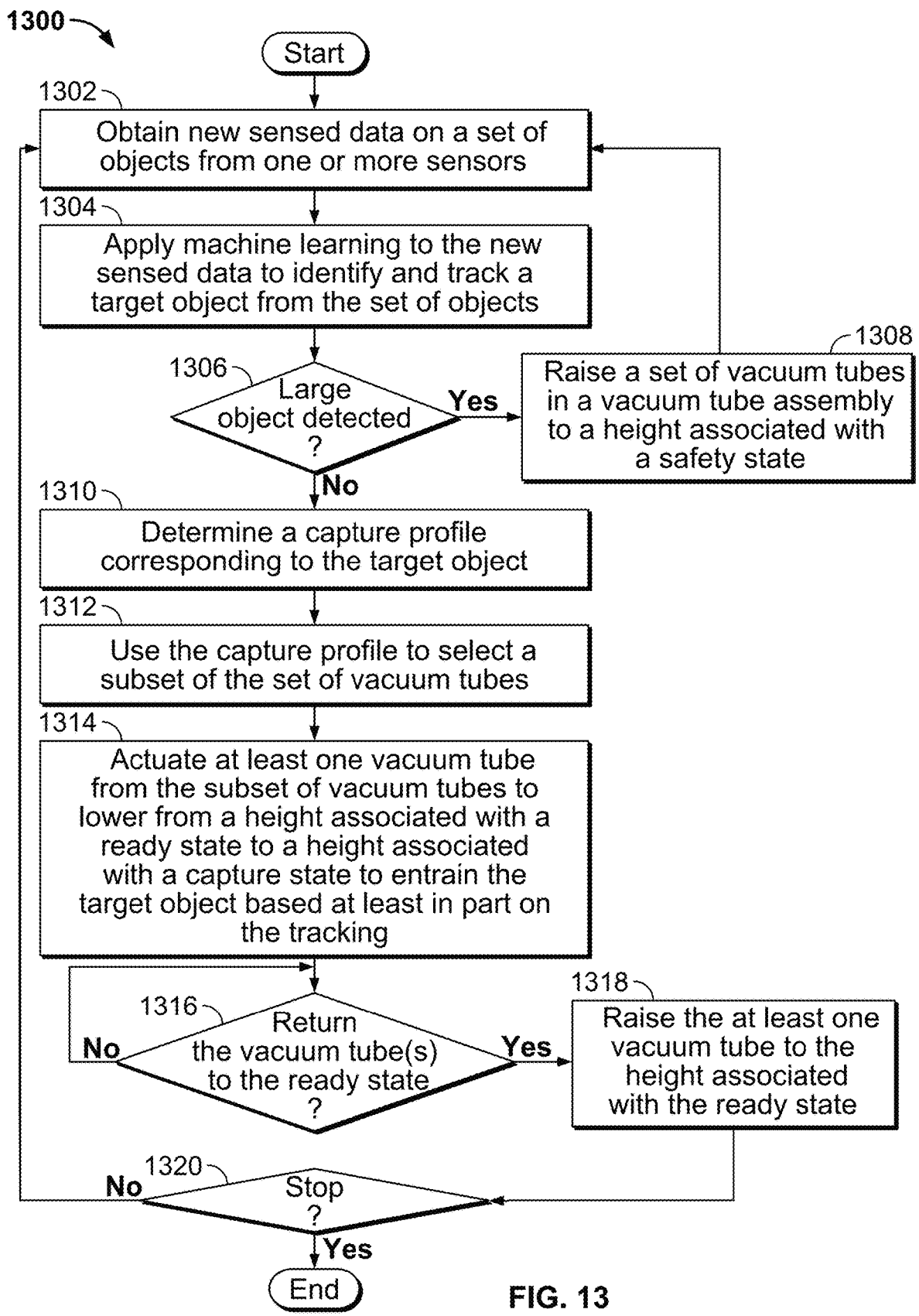
FIG. 13 is a flow diagram showing an example of a process for causing a vacuum tube assembly to perform a capture operation on a target object in accordance with some embodiments.

FIG. 13 is a flow diagram showing an example of a process for causing a vacuum tube assembly to perform a capture operation on a target object in accordance with some embodiments. In some embodiments, process 1300 is implemented at a sorting control device such as sorting control device 114 of system 100 of FIG. 1. In some embodiments, process 1300 is implemented at a vacuum tube assembly such as vacuum tube assembly 102 of system 100 of FIG. 1.

Process 1300 describes an example process of continually using new sensed data to identify a target object and causing a vacuum tube assembly to lower at least one vacuum tube to capture that target object.

At 1302, new sensed data on a set of objects is obtained from one or more sensors. New sensed data can be obtained from one or more types of sensors (e.g., cameras, NIR sensors, volumetric sensors) that are directed on the set of objects. For example, the set of objects is part of a material stream that is being transported by a conveyor device towards a vacuum tube assembly in a sorting facility.

At 1304, machine learning is applied to the new sensed data to identify and track a target object from the set of objects. The new sensed data is input into one or more machine learning models (e.g., neural networks) that have been trained to recognize attributes of the objects that appear within the sensed data. The determined object attributes are compared to a set of target object criteria, and objects whose attributes match the criteria are identified as target objects. In some embodiments, a dynamic model (e.g., the Kalman filter) is applied to the sensed data to track the speed and/or trajectory of each (e.g., target) object along the conveyor device. For example, the tracked speed and/or trajectory of an object can be used to determine when the object will arrive in the target area/proximity of the vacuum tube assembly.

At 1306, whether a large object is detected is determined. In the event that a large object is detected, control is transferred to 1308. Otherwise, in the event that a large object is not detected, control is transferred to 1310. In some embodiments, the determined object attributes are also compared to a set of large object criteria to determine whether a large object is among the set of objects. For example, the set of large object criteria describes attributes (e.g., height, width, length, mass, volume, size of bounding polygon) associated with a large object.

At 1308, a set of vacuum tubes in a vacuum tube assembly is raised to a height associated with a safety state. If a large object is detected, then a control signal is provided to the vacuum tube assembly to cause the vacuum tube assembly to raise the vacuum tubes to a height associated with the safety state. As described above, the safety state is when the vacuum tubes are raised to a height relative to the surface of the conveyor device such that the tubes provide clearance for large objects that they are not attempting to entrain so that they do not collide with such objects (e.g., and receive damage or otherwise undesirably knock such objects off the conveyor device).

At 1310, a capture profile corresponding to the target object is determined. An appropriate capture profile that describes the capture parameters that are to be used by the vacuum tube assembly to capture the target object is selected (e.g., based on attributes of the target object and from a storage of predetermined capture profiles).

At 1312, the capture profile is used to select a subset of the set of vacuum tubes. In some embodiments, the capture profile describes which one or more vacuum tubes of the vacuum tube assembly are to be activated (e.g., actuated and/or caused to emit airflow) in the capture of the target object.

At 1314, at least one vacuum tube from the subset of vacuum tubes is actuated to lower from a height associated with a ready state to a height associated with a capture state to entrain the target object based at least in part on the tracking. At least one of the vacuum tubes from the selected subset of vacuum tubes is caused to be lowered (e.g., based on a control signal) from a higher height (farther from the conveyor device) that is associated with the ready state to a lower height (closer to the conveyor device) that is associated with the capture state. The lowering of the vacuum tube(s) will cause the vacuum force at the end of the lowered vacuum tubes to increase relative to the target object on the conveyor device and therefore, increase the chance that the target object will be entrained into the lowered tube(s). In some embodiments, the tracking of the speed and/or the trajectory of the target object is used to determine the timing at which the vacuum tube(s) should be lowered in an attempt to capture the target object. For example, the control signal to trigger the lowering of the vacuum tube(s) can indicate when the target object is expected to enter the target area of the vacuum tube assembly or can be sent before the target object is expected to enter the target area of the vacuum tube assembly.

At 1316, whether the at least one vacuum tube is to be returned to the ready state is determined. In the event that the at least one vacuum tube is to be returned to the ready state, control is transferred to 1318. Otherwise, in the event that the at least one vacuum tube is not to be returned to the ready state, step 1316 is returned to after a wait. In some embodiments, the lowered vacuum tube(s) are returned to the higher height that is associated with the ready state in the event that a dwell time associated with the capture state has elapsed and/or it is detected that the target object has been successfully entrained/captured by the vacuum tubes. For example, that the target object has been successfully entrained/captured by the vacuum tubes can be detected by a pressure and/or optical sensor in the vacuum tube detecting a change in pressure and/or light that is associated with the target object having passed through the entire tube. In some embodiments, dwell times may be determined dynamically by a control system signal to the actuation mechanism of the vacuum tubes (e.g., the motor, or may be built into the rack, screw, or cam-shaft profile). In some embodiments, a dwell time is varied dynamically based upon the upstream flow of target objects. For example, in the event that the sorting control device identifies multiple objects close together along the belt, the sorting control device changes the dwell time for the capture tube(s) to ensure that multiple objects can be captured. This may entail not retracting the lowered vacuum tube(s) to a height associated with the ready state, or only partially retracting in anticipation of the next capture operation.

At 1318, the at least one vacuum tube is raised to the height associated with the ready state. After the target object has been successfully captured by the lowered vacuum tube(s) and/or the dwell time at the capture state has already elapsed, the lowered vacuum tube(s) are raised back to the height associated with the ready state.

At 1320, whether more target objects are to be captured by the vacuum tube assembly is determined. In the event that more target objects are to be captured by the vacuum tube assembly, control is returned to 1302. Otherwise, in the event that no more target objects are to be captured by the vacuum tube assembly, process 1300 ends.

Figure 14:
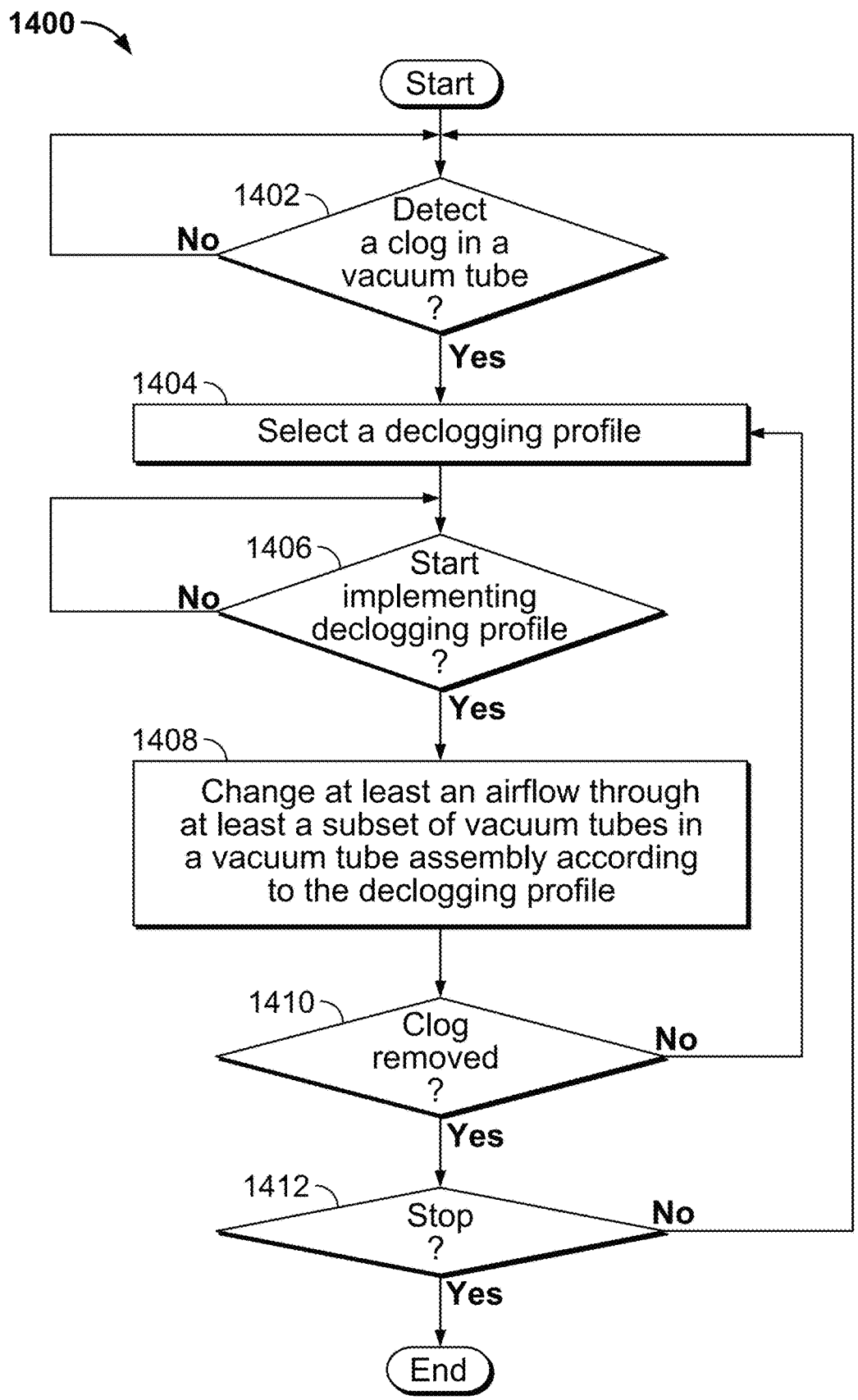
FIG. 14 is a flow diagram showing an example of a process for removing a clog from a vacuum tube assembly in accordance with some embodiments.

FIG. 14 is a flow diagram showing an example of a process for removing a clog from a vacuum tube assembly in accordance with some embodiments. In some embodiments, process 1400 is implemented at a sorting control device such as sorting control device 114 of system 100 of FIG. 1. In some embodiments, process 1400 is implemented at a vacuum tube assembly such as vacuum tube assembly 102 of system 100 of FIG. 1.

At 1402, whether a clog in a vacuum tube is detected is determined. In the event that the clog is detected in the vacuum tube, control is transferred to 1404. Otherwise, in the event that the clog is not detected in the vacuum tube, control is returned to 1402 after a wait. In some embodiments, a clog is detected based on a feedback signal from a sensor that is located inside the vacuum tube assembly. For example, the sensor can be a pressure sensor or an optical sensor. For example, the clog can be located inside a vacuum tube or near one end of a vacuum tube. For example, the sensor can detect a clog if it measures a reading that deviates more than a predetermined amount from a given value. For instance, if an optical sensor detects a decrease of measured light for more than a given amount of time and/or that is more than a threshold decrease in light, then a clog is detected. In another instance, if a pressure sensor detects a change of measured pressure for more than a given amount of time and/or that is more than a threshold decrease in light, then a clog is detected. For example, optical sensors may be placed in vacuum lines at regular intervals, enabling rapid isolation of blockage areas.

At 1404, a declogging profile is selected. For example, a declogging profile is selected based on the location and/or type of clog that is detected. In some embodiments, the declogging profile is selected based on historical data and/or machine learning.

At 1406, whether to start implementing the declogging profile is determined. In the event that the declogging profile should start to be implemented, control is transferred to 1408. Otherwise, in the event that the declogging profile should not be implemented yet, control is returned to 1406 after a wait. In some embodiments, declogging techniques that are described by the declogging profile are opportunistically implemented so as to not create an interruption in the normal sorting of target objects. For example, if a lull in sorting activity to be performed by the vacuum tube assembly is determined (e.g., due to a current lack of target objects that are approaching the vacuum tube assembly), then the vacuum tube assembly may be instructed to commence the declogging techniques.

At 1408, at least an airflow through at least a subset of vacuum tubes in a vacuum assembly is changed according to the declogging profile. As mentioned above, the declogging profile can describe one or more techniques to be used to remove the clog/obstruction. For example, one technique described by the declogging profile can be to adjust either the direction and/or the force of the airflow that is channeled through the vacuum tube(s). In a first example, the vacuum airflow that is normally channeled through a clogged vacuum tube can be reversed to become positive airflow in an attempt to push out the clog from the lower end of the tube. In a second example, the vacuum airflow of the vacuum tubes can be increased to force the clogged material to move. In a third example, caps can be actuated to briefly cover at least one of the vacuum tubes to build pressure in those tubes to force the clogged material to move. In a fourth example, a physical clearing mechanism (e.g., a plunger) may be added to the vacuum tube in order to clear the end clogs. In a fifth example, such a plunger is mounted at the top of the vacuum tube, with a "plunging device" inside the tube. During normal operation, such a plunger is retracted and forms a smooth top for the tube. In the event of a clog, a linear (or other) actuator causes the plunger to extend into the tube, thereby pushing the clogging material back out the end and onto the conveyor device. The plunger then retracts and normal operation is resumed.

At 1410, whether the clog has been removed is determined. In the event that the clog has been removed, control is transferred to 1412. Otherwise, in the event that the clog has not been removed, control is returned to 1404. For example, whether the clog has been removed can be determined based on new feedback from the (e.g., optical or pressure) sensors that are located inside the vacuum tube assembly. For example, if such sensors measure readings that are within a given margin of a normal reading, then it is determined that the clog has been removed (e.g., the jammed material has passed through either end of the vacuum tube that it was clogging).

At 1412, whether more clogs are to be detected is determined. In the event that more clogs are to be detected, control is returned to 1402. Otherwise, in the event that no more clogs are to be detected, process 1400 ends.

While process 1400 describes an example process for detecting a clog and then the removal of the clog, in some embodiments, techniques to proactively prevent clogs from occurring are implemented. To prevent material from blocking the vacuum tube assembly, a variety of techniques can be used: Vacuum tubes may utilize areas of clear material (e.g., acrylics) to enable operators to see areas of blockage. Blockages may be prevented by incorporating small venturi holes in the piping to create boundary layer turbulence, preventing material from sticking to the sides. Periodic boosting of the airflow, or even reverse airflow may be utilized to proactively prevent materials from jamming. The source of reverse airflow may be a compressed air source that is different from the vacuum source, and may be coupled to a valve to enable or disable the operation. A knife edge may be incorporated at the tube end to cut unwanted or larger materials, or active spinning wheels may be utilized to both facilitate ingestion but also push material through. Gravity collectors (e.g., such as shown in FIG. 8) may be used within the system to cause heavy objects to drop out of the flow. A clearing ring (e.g., such as shown in FIG. 9) may also be used around the vacuum tubes, such that upon retraction of the tube inside the ring, stuck material is pushed off of the vacuum tube.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A sorting system, comprising:
   a vacuum generator configured to generate a vacuum airflow;
   one or more tubes coupled to the vacuum generator and configured to channel the vacuum airflow;
   an actuation mechanism coupled to the one or more tubes, wherein the actuation mechanism is configured to actuate at least one tube from a first position relative to a material stream to a second position relative to the material stream, wherein the first position is farther from the material stream than the second position; and
   a processor configured to:
      detect a clog has occurred in a first tube in the one or more tubes; and
      cause a positive airflow to be channeled through the first tube to remove the clog.

2. The sorting system of claim 1, wherein the processor is further configured to:
   obtain sensed data of objects on the material stream; and
   apply machine learning to the sensed data to identify a target object from the material stream, wherein the at least one tube is actuated from the first position to the second position to capture the target object.

3. The sorting system of claim 2, wherein the sensed data comprises one or more images.

4. The sorting system of claim 2, wherein the sensed data comprises hyperspectral data.

5. The sorting system of claim 2, wherein the processor is further configured to:
   receive a control signal comprising one or more capture parameters, wherein the at least one tube is actuated from the first position to the second position to capture the target object based at least in part on the one or more capture parameters.

6. The sorting system of claim 1, further comprising a clearing ring that the at least one tube is configured to pass through as the at least one tube is actuated from the second position to the first position.

7. The sorting system of claim 1, further comprising a wherein the processor is further configured to:
   increase a pressure on the vacuum airflow that is channeled through the first tube to remove the clog.

8. The sorting system of claim 1, wherein the processor is further configured to:
   cause a cap to cover an end of the first tube to cause a buildup of pressure.

9. The sorting system of claim 8, wherein the processor is further configured to cause the cap to be removed from covering the end of the first tube to release the clog under the buildup of pressure.

10. The sorting system of claim 1, further comprising a gravity trap that is coupled to the one or more tubes.

11. The sorting system of claim 1, further comprising an array of air orifices that is configured to channel airflow towards the material stream.

12. The sorting system of claim 1, wherein the at least one tube comprises a knife edge at an end of the at least one tube.

13. A sorting system, comprising:
   a sensor configured to obtain sensed data of objects in a material stream; and
   a processor configured to:
      identify target objects in the material stream based at least in part on the sensed data;
      determine a timing associated with a target object entering a target area relative to a vacuum tube, wherein the vacuum tube is operable to be actuated, wherein the vacuum tube is configured to translate relative to the material stream, wherein the vacuum tube is translated towards or away from the material stream based on the timing;
      detect a clog has occurred in the vacuum tube; and
      cause a positive airflow to be channeled through the vacuum tube to remove the clog.

14. The sorting system of claim 13, wherein the processor is further configured to:
   determine a large object in the material stream, wherein the large object comprises an object that meets a set of large object criteria; and
   wherein the vacuum tube is configured to translate away from the material stream to avoid colliding with the large object.

15. The sorting system of claim 13, wherein the identification of the target objects in the material stream is based at least in part on applying machine learning to the sensed data.

16. The sorting system of claim 13, wherein the vacuum tube is configured to channel a vacuum airflow that entrains objects into the vacuum tube.

17. The sorting system of claim 13, wherein the timing associated with the target object entering the target area relative to the vacuum tube is determined based at least in part on determining a trajectory associated with the target object based at least in part on the sensed data.

18. A sorting system, comprising:
   a vacuum generator configured to generate a vacuum airflow;
   a tube coupled to the vacuum generator, wherein the tube is configured to channel the vacuum airflow from the vacuum generator through the tube, wherein the tube is configured to be actuatable from a first position relative to a material stream to a second position relative to the material stream, wherein the first position is farther from the material stream than the second position;
   a sensor configured to determine a clog in the tube, wherein the vacuum airflow is controlled to remove the clog from the tube; and
   a processor configured to:
      detect the clog has occurred in the tube; and
      cause a positive airflow to be channeled through the tube.

19. The sorting system of claim 18, wherein the sensor is an optical sensor or a pressure sensor.

20. The sorting system of claim 18, wherein the vacuum airflow is controlled including by increasing a pressure of the vacuum airflow.

21. A sorting system, comprising:
   a vacuum generator configured to generate a vacuum airflow;
   one or more tubes coupled to the vacuum generator and configured to channel the vacuum airflow;
   an actuation mechanism coupled to the one or more tubes, wherein the actuation mechanism is configured to actuate at least one tube from a first position relative to a material stream to a second position relative to the material stream, wherein the first position is farther from the material stream than the second position; and
   a clearing ring that the at least one tube is configured to pass through as the at least one tube is actuated from the second position to the first position.

22. A sorting system, comprising:
a vacuum generator configured to generate a vacuum airflow;
one or more tubes coupled to the vacuum generator and configured to channel the vacuum airflow;
an actuation mechanism coupled to the one or more tubes, wherein the actuation mechanism is configured to actuate at least one tube from a first position relative to a material stream to a second position relative to the material stream, wherein the first position is farther from the material stream than the second position; and
a processor configured to:
  detect a clog has occurred in a first tube in the one or more tubes; and
  increase a pressure on the vacuum airflow that is channeled through the first tube to remove the clog.

23. A sorting system, comprising:
a vacuum generator configured to generate a vacuum airflow;
one or more tubes coupled to the vacuum generator and configured to channel the vacuum airflow;
an actuation mechanism coupled to the one or more tubes, wherein the actuation mechanism is configured to actuate at least one tube from a first position relative to a material stream to a second position relative to the material stream, wherein the first position is farther from the material stream than the second position; and
a processor configured to:
  detect a clog has occurred in a first tube in the one or more tubes; and
  cause a cap to cover an end of the first tube to cause a buildup of pressure.

24. A sorting system, comprising:
a vacuum generator configured to generate a vacuum airflow;
one or more tubes coupled to the vacuum generator and configured to channel the vacuum airflow;
an actuation mechanism coupled to the one or more tubes, wherein the actuation mechanism is configured to actuate at least one tube from a first position relative to a material stream to a second position relative to the material stream, wherein the first position is farther from the material stream than the second position; and
a gravity trap that is coupled to the one or more tubes.

25. A sorting system, comprising:
a vacuum generator configured to generate a vacuum airflow;
one or more tubes coupled to the vacuum generator and configured to channel the vacuum airflow;
an actuation mechanism coupled to the one or more tubes, wherein the actuation mechanism is configured to actuate at least one tube from a first position relative to a material stream to a second position relative to the material stream, wherein the first position is farther from the material stream than the second position; and
an array of air orifices that is configured to channel airflow towards the material stream.

26. A sorting system, comprising:
a vacuum generator configured to generate a vacuum airflow;
one or more tubes coupled to the vacuum generator and configured to channel the vacuum airflow, wherein at least one tube comprises a knife edge at an end of the at least one tube; and
an actuation mechanism coupled to the one or more tubes, wherein the actuation mechanism is configured to actuate the at least one tube from a first position relative to a material stream to a second position relative to the material stream, wherein the first position is farther from the material stream than the second position.

* * * * *